United States Patent
Zhang et al.

(10) Patent No.: US 10,103,863 B2
(45) Date of Patent: Oct. 16, 2018

(54) SUPERPOSITION CODING METHOD, APPARATUS, AND SYSTEM

(71) Applicant: Huawei Technologies Co., Ltd., Shenzhen (CN)

(72) Inventors: Wen Zhang, Shenzhen (CN); Yongxia Lyu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 14/935,090

(22) Filed: Nov. 6, 2015

(65) Prior Publication Data

US 2016/0065351 A1   Mar. 3, 2016

Related U.S. Application Data

(63) Continuation of application No. PCT/CN2013/075342, filed on May 8, 2013.

(51) Int. Cl.
*H04L 5/00* (2006.01)
*H04L 27/18* (2006.01)
(Continued)

(52) U.S. Cl.
CPC .......... *H04L 5/0082* (2013.01); *H04L 5/0044* (2013.01); *H04L 5/0046* (2013.01);
(Continued)

(58) Field of Classification Search
None
See application file for complete search history.

(56) References Cited

U.S. PATENT DOCUMENTS

2007/0270170 A1   11/2007  Yoon et al.
2010/0246711 A1*  9/2010   Kishigami .......... H04L 5/0039
                                               375/295
(Continued)

FOREIGN PATENT DOCUMENTS

CN           101627583 A     1/2010
CN           101989890 A     3/2011
(Continued)

OTHER PUBLICATIONS

"An Efficient Hierarchical Modulation based DL Data Transmission for LTE-Advanced," 3GPP TSG-RAN1 #56-BIS, Seoul, Korea, R1-091499, pp. 1-17, 3$^{rd}$ Generation Partnership Project, Valbonne, France (Mar. 23-27, 2009).

(Continued)

*Primary Examiner* — Manuel Rangel
(74) *Attorney, Agent, or Firm* — Ledig, Voit & Mayer, Ltd

(57) ABSTRACT

The present invention discloses a superposition coding method, apparatus, and system, The method of the present invention includes: generating a superposition coding signal according to bit data to be separately sent to the at least two user equipments (UEs); sending notification signaling to at least one UE in the at least two UEs, where the notification signaling carries data selection information, and the data selection information is used for instructing the UE to acquire, from bit data demodulated from the superposition coding signal, at least one bit of data that is of a specific quantity and at a specific location as received data; and sending the superposition coding signal to the at least two UEs. The present invention is mainly applied in a demodulation process of a superposition coding signal.

8 Claims, 7 Drawing Sheets

(51) Int. Cl.
*H04L 27/34* (2006.01)
*H04W 72/04* (2009.01)

(52) U.S. Cl.
CPC .......... *H04L 5/0091* (2013.01); *H04L 27/183* (2013.01); *H04L 27/34* (2013.01); *H04L 27/3488* (2013.01); *H04W 72/042* (2013.01)

(56) References Cited

U.S. PATENT DOCUMENTS

| | | |
|---|---|---|
| 2011/0064030 A1 | 3/2011 | Wu et al. |
| 2011/0222462 A1* | 9/2011 | Ho .................. H04L 27/3488 370/312 |
| 2012/0127888 A1* | 5/2012 | Fujishima .......... H04W 72/085 370/252 |
| 2012/0327888 A1* | 12/2012 | Sankar .................. H04L 5/0053 370/329 |
| 2013/0022005 A1 | 1/2013 | Yano et al. |
| 2013/0100994 A1* | 4/2013 | Merlin .................. H04L 1/0003 375/219 |
| 2013/0107809 A1 | 5/2013 | Ko et al. |
| 2014/0169324 A1* | 6/2014 | Seo .................... H04L 5/001 370/329 |

FOREIGN PATENT DOCUMENTS

| | | |
|---|---|---|
| EP | 1610486 A2 | 12/2005 |
| EP | 2299737 A1 | 3/2011 |
| EP | 2763470 A1 | 8/2014 |
| JP | 5131351 B2 | 11/2012 |
| JP | 2013077926 A | 4/2013 |
| WO | WO 2011095043 A1 | 8/2011 |
| WO | 2011121774 A1 | 10/2011 |

OTHER PUBLICATIONS

"Clarification of Redundancy Version and HARQ Process," Change Request, 3GPP TSG-RAN WG1 Meeting #56 Athens, Greece R1-090626, XP050318507, pp. 1-4, 3rd Generation Partnership Project, Valbonne, France (Feb. 9-13, 2009).
JP 2016/512185, Notice of Reasons for Rejection, dated Sep. 12, 2017.

* cited by examiner

| Second quadrant | First quadrant |
| --- | --- |
| 1011  1001 | 0001  0011 |
| •   • | •   • |
| 1010  1000 | 0000  0010 |
| •   • | •   • |
| 1110  1100 | 0100  0110 |
| •   • | •   • |
| 1111  1101 | 0101  0111 |
| •   • | •   • |
| Third quadrant | Fourth quadrant |

SUPERPOSITION CODING METHOD, APPARATUS, AND SYSTEM

CROSS-REFERENCE TO RELATED APPLICATIONS

This application is a continuation of International Patent Application No. PCT/CN2013/075342, filed on May 8, 2013, which is incorporated herein by reference in its entirety.

TECHNICAL FIELD

The present invention relates to the field of wireless communications, and in particular, to a superposition coding method, apparatus, and system.

BACKGROUND

A superposition coding (SC) technology is a special technology of ultra high data rate (UHDR), and can effectively improve system performance.

Superposition coding may be applied in the prior art to improve a throughput of a wireless communications system, that is, a base station may superpose two or more types of information flows and send a superposed information flow to user equipment (UE), and the UE obtains different information flows according to different demodulation rules. When superposition coding is used, the base station may multiplex a same time-frequency resource for two or more UEs, where the base station uses different transmit powers for the two or more UEs.

The superposition coding technology at present cannot be applied in an existing communications system, for example, a Long Term Evolution (LTE) communications system, a Universal Mobile Telecommunications System (UMTS), or a Code Division Multiple Access (CDMA) communications system.

SUMMARY

The present invention provides a superposition coding method, apparatus, and system, which can apply a superposition coding technology to the foregoing communication systems.

According to a first aspect, the present invention provides a superposition coding method, where the method is applied on a base station side, and the method includes:

generating a superposition coding signal according to bit data to be separately sent to at least two user equipments UEs;

sending notification signaling to at least one UE in the at least two UEs, where the notification signaling carries data selection information, and the data selection information is used for instructing the UE to acquire, from bit data demodulated from the superposition coding signal, at least one bit of data that is of a specific quantity and at a specific location as received data; and sending the superposition coding signal to the at least two UEs.

In a first possible implementation manner of the first aspect, the sending notification signaling to at least one UE in the at least two UEs, where the notification signaling carries data selection information includes:

sending radio resource control RRC signaling to the at least two UEs, where the RRC signaling carries the data selection information; or sending downlink control information DCI to the at least two UEs, where the DCI carries the data selection information; or sending DCI to the at least two UEs, where cyclic redundancy check information CRC in the DCI is scrambled by using a scrambling code, and the scrambling code is used for indicating the data selection information.

In the first aspect or the first possible implementation manner of the first aspect, a second possible implementation manner of the first aspect is further provided, and in the second possible implementation manner of the first aspect, the method further includes:

separately instructing the at least two UEs to select a respective demodulation scheme.

In the second possible implementation manner of the first aspect, a third possible implementation manner of the first aspect is further provided, and in the third possible implementation manner of the first aspect, when a modulation scheme of the superposition coding signal is 16 quadrature amplitude modulation (QAM) modulation, the separately instructing the at least two UEs to select a respective demodulation scheme includes:

instructing first UE to select quadrature phase shift keying (QPSK) demodulation, and instructing second UE to select 16QAM demodulation; or instructing both first UE and second UE to select 16QAM demodulation.

In the third possible implementation manner of the first aspect, a fourth possible implementation manner of the first aspect is further provided, and in the fourth possible implementation manner of the first aspect, when the first UE is instructed to select the QPSK demodulation and the second UE is instructed to select the 16QAM demodulation, data selection information received by the first UE is used for instructing the first UE to acquire both bits of demodulated data as received data, and data selection information received by the second UE is used for instructing the second UE to acquire last two bits of data in four bits of demodulated data as received data; or when both the first UE and the second UE are instructed to select the 16QAM demodulation, data selection information received by the first UE is used for instructing the first UE to use first two bits of data in four bits of demodulated data as received data, and data selection information received by the second UE is used for instructing the second UE to use last two bits of data in four bits of demodulated data as received data.

In the second possible implementation manner of the first aspect, a fifth possible implementation manner of the first aspect is further provided, and in the fifth possible implementation manner of the first aspect, when a modulation scheme of the superposition coding signal is 64QAM modulation, the separately instructing the at least two UEs to select a respective demodulation scheme includes:

instructing first UE to select QPSK demodulation, and instructing second UE to select 64QAM demodulation; or instructing first UE to select 16QAM demodulation, and instructing second UE to select 64QAM demodulation; or instructing both first UE and second UE to select 64QAM demodulation.

In the fifth possible implementation manner of the first aspect, a sixth possible implementation manner of the first aspect is further provided, and in the sixth possible implementation manner of the first aspect, when the first UE is instructed to select the QPSK demodulation and the second UE is instructed to select the 64QAM demodulation, data selection information received by the first UE is used for instructing the first UE to acquire both bits of demodulated data as received data, and data selection information received by the second UE is used for instructing the second UE to acquire last four bits of data in six bits of demodulated data as received data; or when the first UE is instructed to select the 16QAM demodulation and the second UE is instructed to select the 64QAM demodulation, data selection information received by the first UE is used for instructing the first UE to acquire all four bits of demodulated data as received data, and data selection information received by the second UE is used for instructing the second UE to acquire last two bits of data in six bits of demodulated data as received data; or data selection information received by the first UE is used for instructing the first UE to acquire first two bits of data in four bits of demodulated data as received data, and data selection information received by the second UE is used for instructing the second UE to acquire last four bits of data in six bits of demodulated data as received data; or when both the first UE and the second UE are instructed to select the 64QAM demodulation, data selection information received by the first UE is used for instructing the first UE to acquire first two bits of data in six bits of demodulated data as received data, and data selection information received by the second UE is used for instructing the second UE to acquire last four bits of data in six bits of demodulated data as received data; or data selection information received by the first UE is used for instructing the first UE to acquire first four bits of data in six bits of demodulated data as received data, and data selection information received by the second UE is used for instructing the second UE to acquire last two bits of data in six bits of demodulated data as received data.

In the second possible implementation manner of the first aspect, a seventh possible implementation manner of the first aspect is further provided, and in the seventh possible implementation manner of the first aspect, when a modulation scheme of the superposition coding signal is 256QAM modulation, the separately instructing the at least two UEs to select a respective demodulation scheme includes:

instructing first UE to select QPSK demodulation, and instructing second UE to select 256QAM demodulation; or instructing first UE to select 16QAM demodulation, and instructing second UE to select 256QAM demodulation; or instructing first UE to select 64QAM demodulation, and instructing second UE to select 256QAM demodulation; or instructing both first UE and second UE to select 256QAM demodulation.

In the seventh possible implementation manner of the first aspect, an eighth possible implementation manner of the first aspect is further provided, and in the eighth possible implementation manner of the first aspect, when the first UE is instructed to select the QPSK demodulation and the second UE is instructed to select the 256QAM demodulation, data selection information received by the first UE is used for instructing the first UE to acquire both bits of demodulated data as received data, and data selection information received by the second UE is used for instructing the second UE to acquire last six bits of data in eight bits of demodulated data as received data; or when the first UE is instructed to select the 16QAM demodulation and the second UE is instructed to select the 256QAM demodulation, data selection information received by the first UE is used for instructing the first UE to acquire all four bits of demodulated data as received data, and data selection information received by the second UE is used for instructing the second UE to acquire last four bits of data in eight bits of demodulated data as received data; or data selection information received by the first UE is used for instructing the first UE to acquire first two bits of data in four bits of demodulated data as received data, and data selection information received by the second UE is used for instructing the second UE to acquire last six bits of data in eight bits of demodulated data as received data; or when the first UE is instructed to select the 64QAM demodulation and the second UE is instructed to select the 256QAM demodulation, data selection information received by the first UE is used for instructing the first UE to acquire all six bits of demodulated data as received data, and data selection information received by the second UE is used for instructing the second UE to acquire last two bits of data in eight bits of demodulated data as received data; or data selection information received by the first UE is used for instructing the first UE to acquire first two bits of data in six bits of demodulated data as received data, and data selection information received by the second UE is used for instructing the second UE to acquire last six bits of data in eight bits of demodulated data as received data; or data selection information received by the first UE is used for instructing the first UE to acquire first four bits of data in six bits of demodulated data as received data, and data selection information received by the second UE is used for instructing the second UE to acquire last four bits of data in eight bits of demodulated data as received data; or, when both the first UE and the second UE are instructed to select the 256QAM demodulation, data selection information received by the first UE is used for instructing the first UE to acquire first two bits of data in eight bits of demodulated data as received data, and data selection information received by the second UE is used for instructing the second UE to acquire last six bits of data in eight bits of demodulated data as received data; or data selection information received by the first UE is used for instructing the first UE to acquire first four bits of data in eight bits of demodulated data as received data, and data selection information received by the second UE is used for instructing the second UE to acquire last four bits of data in eight bits of demodulated data as received data; or data selection information received by the first UE is used for instructing the first UE to acquire first six bits of data in eight bits of demodulated data as received data, and data selection information received by the second UE is used for instructing the second UE to acquire last two bits of data in eight bits of demodulated data as received data.

In the second possible implementation manner of the first aspect, a ninth possible implementation manner of the first aspect is further provided, and in the ninth possible implementation manner of the first aspect, when a modulation scheme of the superposition coding signal is 256QAM modulation, the separately instructing the at least two UEs to select a respective demodulation scheme includes:

instructing first UE to select QPSK demodulation, instructing second UE to select 16QAM demodulation, and instructing third UE to select 256QAM demodulation; or instructing all of first UE, second UE, and third UE to select 256QAM demodulation.

In the ninth possible implementation manner of the first aspect, a tenth possible implementation manner of the first aspect is further provided, and in the tenth possible implementation manner of the first aspect, when the first UE is instructed to select the QPSK demodulation, the second UE is instructed to select the 16QAM demodulation, and the third UE is instructed to select the 256QAM demodulation, data selection information received by the first UE is used for instructing the first UE to acquire both bits of demodulated data as received data, data selection information received by the second UE is used for instructing the second UE to acquire last two bits of data in four bits of demodulated data as received data, and data selection information received by the third UE is used for instructing the third UE to acquire last four bits of data in eight bits of demodulated data as received data; or when all of the first UE, the second UE, and the third UE are instructed to select the 256QAM demodulation, data selection information received by the first UE is used for instructing the first UE to acquire first two bits of data in eight bits of demodulated data as received data, data selection information received by the second UE is used for instructing the second UE to acquire the third and fourth bits of data in eight bits of demodulated data as received data, and data selection information received by the third UE is used for instructing the third UE to acquire last four bits of data in eight bits of demodulated data as received data.

In the first aspect or the first possible implementation manner of the first aspect, an eleventh possible implementation manner of the first aspect is further provided, and in the eleventh possible implementation manner of the first aspect, the method further includes:

separately acquiring demodulation capability information sent by the at least two UEs; and when demodulation capability information of first UE in the at least two UEs is that only QPSK demodulation is supported, skipping sending the notification signaling to the first UE.

According to a second aspect, the present invention further provides a superposition coding method, where the method is applied on a UE side, and the method includes:

receiving notification signaling sent by a base station, where the notification signaling carries data selection information, and the data selection information is used for instructing a UE to acquire, from bit data demodulated from a received superposition coding signal, at least one bit of data that is of a specific quantity and at a specific location as received data;

receiving the superposition coding signal sent by the base station; and demodulating the superposition coding signal, and acquiring, according to the data selection information, the received data from the bit data demodulated from the superposition coding signal.

In a first possible implementation manner of the second aspect, the receiving notification signaling sent by a base station includes:

receiving radio resource control RRC signaling sent by the base station, where the RRC signaling carries the data selection information; or receiving downlink control information DCI sent by the base station, where the DCI carries the data selection information; or receiving DCI sent by the base station, where cyclic redundancy check information CRC in the DCI is scrambled by using a scrambling code, and the scrambling code is used for indicating the data selection information.

In the second aspect or the first possible implementation manner of the second aspect, a second possible implementation manner of the second aspect is further provided, and in the second possible implementation manner of the second aspect, before the demodulating the superposition coding signal, the method further includes:

selecting a specific demodulation scheme according to an instruction of the base station; and the demodulating the superposition coding signal includes:

demodulating the superposition coding signal according to the specific demodulation scheme.

In the second possible implementation manner of the second aspect, a third possible implementation manner of the second aspect is further provided, and in the third possible implementation manner of the second aspect, when a demodulation scheme indicated by the base station is quadrature phase shift keying QPSK demodulation, the data selection information is acquiring both bits of demodulated data as the received data; or when a demodulation scheme indicated by the base station is 16QAM demodulation, the data selection information is acquiring first two bits of data or last two bits of data in four bits of demodulated data as the received data, or the data selection information is acquiring all four bits of demodulated data as the received data; or, when a demodulation scheme indicated by the base station is 64QAM demodulation, the data selection information is acquiring first two bits of data or last two bits of data in six bits of demodulated data as the received data, or the data selection information is acquiring first four bits of data or last four bits of data in six bits of demodulated data as the received data, or the data selection information is acquiring all six bits of demodulated data as the received data; or when a demodulation scheme indicated by the base station is 256QAM demodulation, the data selection information is acquiring first two bits of data or last two bits of data in eight bits of demodulated data as the received data, or the data selection information is acquiring first four bits of data or last four bits of data in eight bits of demodulated data as the received data, or the data selection information is acquiring first six bits of data or last six bits of data in eight bits of demodulated data as the received data.

In the second aspect and the first, second, and third possible implementation manners of the second aspect, a fourth possible implementation manner of the second aspect is further provided, and in the fourth possible implementation manner of the second aspect, the demodulating the superposition coding signal includes:

if a demodulation scheme selection instruction sent by the base station is not received, performing QPSK demodulation on the superposition coding signal.

According to a third aspect, the present invention further provides a superposition coding apparatus, where the apparatus is applied on a base station side, and the apparatus includes:

a generating unit, configured to generate a superposition coding Superposition Coding signal according to bit data to be separately sent to at least two user equipments UEs; and a sending unit, configured to send notification signaling to at least one UE in the at least two UEs, where the notification signaling carries data selection information, and the data selection information is used for instructing the UE to acquire, from bit data demodulated from the superposition coding signal, at least one bit of data that is of a specific quantity and at a specific location as received data, where the sending unit is further configured to send the superposition coding signal to the at least two UEs.

In a first possible implementation manner of the third aspect, the sending unit includes:

a first sending subunit, configured to send radio resource control RRC signaling to the at least two UEs, where the RRC signaling carries the data selection information; or a second sending subunit, configured to send downlink control information DCI to the at least two UEs, where the DCI carries the data selection information; or a third sending subunit, configured to send DCI to the at least two UEs, where cyclic redundancy check information CRC in the DCI is scrambled by using a scrambling code, and the scrambling code is used for indicating the data selection information.

In the third aspect and the first possible implementation manner of the third aspect, a second possible implementation manner of the third aspect is further provided, and in the second possible implementation manner of the third aspect, the apparatus further includes:

an instruction unit, configured to separately instruct the at least two UEs to select a respective demodulation scheme.

In the second possible implementation manner of the third aspect, a third possible implementation manner of the third aspect is further provided, and in the third possible implementation manner of the third aspect, when a modulation scheme of the superposition coding signal is 16QAM modulation:

the instruction unit is configured to instruct first UE to select QPSK demodulation, and instruct second UE to select 16QAM demodulation; or the instruction unit is configured to instruct both first UE and second UE to select 16QAM demodulation.

In the third possible implementation manner of the third aspect, a fourth possible implementation manner of the third aspect is further provided, and in the fourth possible implementation manner of the third aspect, the sending unit is configured to: when the instruction unit instructs the first UE to select the QPSK demodulation and instructs the second UE to select the 16QAM demodulation, send the notification signaling to the first UE and the second UE, where data selection information received by the first UE is used for instructing the first UE to acquire both bits of demodulated data as received data, and data selection information received by the second UE is used for instructing the second UE to acquire last two bits of data in four bits of demodulated data as received data; or the sending unit is configured to: when the instruction unit instructs both the first UE and the second UE to select the 16QAM demodulation, send the notification signaling to the first UE and the second UE, where data selection information received by the first UE is used for instructing the first UE to use first two bits of data in four bits of demodulated data as received data, and data selection information received by the second UE is used for instructing the second UE to use last two bits of data in four bits of demodulated data as received data.

In the second possible implementation manner of the third aspect, a fifth possible implementation manner of the third aspect is further provided, and in the fifth possible implementation manner of the third aspect, when a modulation scheme of the superposition coding signal is 64QAM modulation:

the instruction unit is configured to instruct first UE to select QPSK demodulation, and instruct second UE to select 64QAM demodulation; or the instruction unit is configured to instruct first UE to select 16QAM demodulation, and instruct second UE to select 64QAM demodulation; or the instruction unit is configured to instruct both first UE and second UE to select 64QAM demodulation.

In the fifth possible implementation manner of the third aspect, a sixth possible implementation manner of the third aspect is further provided, and in the sixth possible implementation manner of the third aspect, the sending unit is configured to: when the instruction unit instructs the first UE to select the QPSK demodulation and instructs the second UE to select the 64QAM demodulation, send the notification signaling to the first UE and the second UE, where data selection information received by the first UE is used for instructing the first UE to acquire both bits of demodulated data as received data, and data selection information received by the second UE is used for instructing the second UE to acquire last four bits of data in six bits of demodulated data as received data; or the sending unit is configured to: when the instruction unit instructs the first UE to select the 16QAM demodulation and instructs the second UE to select the 64QAM demodulation, send the notification signaling to the first UE and the second UE, where data selection information received by the first UE is used for instructing the first UE to acquire all four bits of demodulated data as received data, and data selection information received by the second UE is used for instructing the second UE to acquire last two bits of data in six bits of demodulated data as received data; or the sending unit is configured to: when the instruction unit instructs the first UE to select the 16QAM demodulation and instructs the second UE to select the 64QAM demodulation, send the notification signaling to the first UE and the second UE, where data selection information received by the first UE is used for instructing the first UE to acquire first two bits of data in four bits of demodulated data as received data, and data selection information received by the second UE is used for instructing the second UE to acquire last four bits of data in six bits of demodulated data as received data; or the sending unit is configured to: when the instruction unit instructs both the first UE and the second UE to select the 64QAM demodulation, send the notification signaling to the first UE and the second UE, where data selection information received by the first UE is used for instructing the first UE to acquire first two bits of data in six bits of demodulated data as received data, and data selection information received by the second UE is used for instructing the second UE to acquire last four bits of data in six bits of demodulated data as received data; or the sending unit is configured to: when the instruction unit instructs both the first UE and the second UE to select the 64QAM demodulation, send the notification signaling to the first UE and the second UE, where data selection information received by the first UE is used for instructing the first UE to acquire first four bits of data in six bits of demodulated data as received data, and data selection information received by the second UE is used for instructing the second UE to acquire last two bits of data in six bits of demodulated data as received data.

In the second possible implementation manner of the third aspect, a seventh possible implementation manner of the third aspect is further provided, and in the seventh possible implementation manner of the third aspect, when a modulation scheme of the superposition coding signal is 256QAM modulation:

the instruction unit is configured to instruct first UE to select QPSK demodulation, and instruct second UE to select 256QAM demodulation; or the instruction unit is configured to instruct first UE to select 16QAM demodulation, and instruct second UE to select 256QAM demodulation; or the instruction unit is further configured to instruct first UE to select 64QAM demodulation, and instruct second UE to select 256QAM demodulation; or the instruction unit is further configured to instruct both first UE and second UE to select 256QAM demodulation.

In the seventh possible implementation manner of the third aspect, an eighth possible implementation manner of the third aspect is further provided, and in the eighth possible implementation manner of the third aspect, the sending unit is configured to: when the instruction unit instructs the first UE to select the QPSK demodulation and instructs the second UE to select the 256QAM demodulation, send the notification signaling to the first UE and the second UE, where data selection information received by the first UE is used for instructing the first UE to acquire both bits of demodulated data as received data, and data selection information received by the second UE is used for instructing the second UE to acquire last six bits of data in eight bits of demodulated data as received data; or the sending unit is configured to: when the instruction unit instructs the first UE to select the 16QAM demodulation and instructs the second UE to select the 256QAM demodulation, send the notification signaling to the first UE and the second UE, where data selection information received by the first UE is used for instructing the first UE to acquire all four bits of demodulated data as received data, and data selection information received by the second UE is used for instructing the second UE to acquire last four bits of data in eight bits of demodulated data as received data; or the sending unit is configured to: when the instruction unit instructs the first UE to select the 16QAM demodulation and instructs the second UE to select the 256QAM demodulation, send the notification signaling to the first UE and the second UE, where data selection information received by the first UE is used for instructing the first UE to acquire first two bits of data in four bits of demodulated data as received data, and data selection information received by the second UE is used for instructing the second UE to acquire last six bits of data in eight bits of demodulated data as received data; or the sending unit is configured to: when the instruction unit instructs the first UE to select the 64QAM demodulation and instructs the second UE to select the 256QAM demodulation, send the notification signaling to the first UE and the second UE, where data selection information received by the first UE is used for instructing the first UE to acquire all six bits of demodulated data as received data, and data selection information received by the second UE is used for instructing the second UE to acquire last two bits of data in eight bits of demodulated data as received data; or the sending unit is configured to: when the instruction unit instructs the first UE to select the 64QAM demodulation and instructs the second UE to select the 256QAM demodulation, send the notification signaling to the first UE and the second UE, where data selection information received by the first UE is used for instructing the first UE to acquire first two bits of data in six bits of demodulated data as received data, and data selection information received by the second UE is used for instructing the second UE to acquire last six bits of data in eight bits of demodulated data as received data; or the sending unit is configured to: when the instruction unit instructs the first UE to select the 64QAM demodulation and instructs the second UE to select the 256QAM demodulation, send the notification signaling to the first UE and the second UE, where data selection information received by the first UE is used for instructing the first UE to acquire first four bits of data in six bits of demodulated data as received data, and data selection information received by the second UE is used for instructing the second UE to acquire last four bits of data in eight bits of demodulated data as received data; or the sending unit is configured to: when the instruction unit instructs both the first UE and the second UE to select the 256QAM demodulation, send the notification signaling to the first UE and the second UE, where data selection information received by the first UE is used for instructing the first UE to acquire first two bits of data in eight bits of demodulated data as received data, and data selection information received by the second UE is used for instructing the second UE to acquire last six bits of data in eight bits of demodulated data as received data; or the sending unit is configured to: when the instruction unit instructs both the first UE and the second UE to select the 256QAM demodulation, send the notification signaling to the first UE and the second UE, where data selection information received by the first UE is used for instructing the first UE to acquire first four bits of data in eight bits of demodulated data as received data, and data selection information received by the second UE is used for instructing the second UE to acquire last four bits of data in eight bits of demodulated data as received data; or the sending unit is configured to: when the instruction unit instructs both the first UE and the second UE to select the 256QAM demodulation, send the notification signaling to the first UE and the second UE, where data selection information received by the first UE is used for instructing the first UE to acquire first six bits of data in eight bits of demodulated data as received data, and data selection information received by the second UE is used for instructing the second UE to acquire last two bits of data in eight bits of demodulated data as received data.

In the second possible implementation manner of the third aspect, a ninth possible implementation manner of the third aspect is further provided, and in the ninth possible implementation manner of the third aspect, when a modulation scheme of the superposition coding signal is 256QAM modulation:

the instruction unit is configured to instruct first UE to select QPSK demodulation, instruct second UE to select 16QAM demodulation, and instruct third UE to select 256QAM demodulation; or the instruction unit is further configured to instruct all of first UE, second UE, and third UE to select 256QAM demodulation.

In the ninth possible implementation manner of the third aspect, a tenth possible implementation manner of the third aspect is further provided, and in the tenth possible implementation manner of the third aspect, the sending unit is configured to: when the instruction unit instructs the first UE to select the QPSK demodulation, instructs the second UE to select the 16QAM demodulation, and instructs the third UE to select the 256QAM demodulation, send the notification signaling to the first UE, the second UE, and the third UE, where data selection information received by the first UE is used for instructing the first UE to acquire both bits of demodulated data as received data, data selection information received by the second UE is used for instructing the second UE to acquire last two bits of data in four bits of demodulated data as received data, and data selection information received by the third UE is used for instructing the third UE to acquire last four bits of data in eight bits of demodulated data as received data; or the sending unit is configured to: when the instruction unit instructs all of the first UE, the second UE, and the third UE to select the 256QAM demodulation, send the notification signaling to the first UE, the second UE, and the third UE, where data selection information received by the first UE is used for instructing the first UE to acquire first two bits of data in eight bits of demodulated data as received data, data selection information received by the second UE is used for instructing the second UE to acquire the third and fourth bits of data in eight bits of demodulated data as received data, and data selection information received by the third UE is used for instructing the third UE to acquire last four bits of data in eight bits of demodulated data as received data.

In the third aspect and the first possible implementation manner of the third aspect, an eleventh possible implementation manner of the third aspect is further provided, and in the eleventh possible implementation manner of the third aspect, the apparatus further includes:

an acquiring unit, configured to separately acquire demodulation capability information sent by the at least two UEs; and the sending unit is configured to: when demodulation capability information, acquired by the acquiring unit, of first UE in the at least two UEs is that only QPSK demodulation is supported, skip sending the notification signaling to the first UE.

According to a fourth aspect, the present invention further provides a superposition coding apparatus, where the apparatus is applied on a UE side, and the apparatus includes:

a receiving unit, configured to receive notification signaling sent by a base station, where the notification signaling carries data selection information, and the data selection information is used for instructing user equipment UE to acquire, from bit data demodulated from a received superposition coding signal, at least one bit of data that is of a specific quantity and at a specific location as received data, where the receiving unit is further configured to receive the superposition coding signal sent by the base station; and a demodulation unit, configured to demodulate the superposition coding signal received by the receiving unit, and acquire, according to the data selection information received by the receiving unit, the received data from the bit data demodulated from the superposition coding signal.

In a first possible implementation manner of the fourth aspect, the receiving unit includes:

a first receiving subunit, configured to receive radio resource control RRC signaling sent by the base station, where the RRC signaling carries the data selection information; or a second receiving subunit, configured to receive downlink control information DCI sent by the base station, where the DCI carries the data selection information; or a third receiving subunit, configured to receive DCI sent by the base station, where cyclic redundancy check information CRC in the DCI is scrambled by using a scrambling code, and the scrambling code is used for indicating the data selection information.

In the fourth aspect or the first possible implementation manner of the fourth aspect, a second possible implementation manner of the fourth aspect is further provided, and in the second possible implementation manner of the fourth aspect, the apparatus further includes a selection unit:

the receiving unit is configured to receive an instruction that is sent by the base station and used for selecting a demodulation scheme;

the selection unit is configured to select a specific demodulation scheme according to the instruction received by the receiving unit; and the demodulation unit is configured to demodulate the superposition coding signal according to the specific demodulation scheme selected by the selection unit.

In the second possible implementation manner of the fourth aspect, a third possible implementation manner of the fourth aspect is further provided, and in the third possible implementation manner of the fourth aspect, the receiving unit is configured to:

when the selection unit selects quadrature phase shift keying QPSK demodulation according to the instruction received by the receiving unit, receive the notification signaling, where the data selection information carried in the notification signaling is acquiring both bits of demodulated data as the received data; or when the selection unit selects 16QAM demodulation according to the instruction received by the receiving unit, receive the notification signaling, where the data selection information carried in the notification signaling is acquiring first two bits of data or last two bits of data in four bits of demodulated data as the received data; or when the selection unit selects 16QAM demodulation according to the instruction received by the receiving unit, receive the notification signaling, where the data selection information carried in the notification signaling is acquiring all four bits of demodulated data as the received data; or when the selection unit selects 64QAM demodulation according to the instruction received by the receiving unit, receive the notification signaling, where the data selection information carried in the notification signaling is acquiring first two bits of data or last two bits of data in six bits of demodulated data as the received data; or when the selection unit selects 64QAM demodulation according to the instruction received by the receiving unit, receive the notification signaling, where the data selection information carried in the notification signaling is acquiring first four bits of data or last four bits of data in six bits of demodulated data as the received data; or when the selection unit selects 64QAM demodulation according to the instruction received by the receiving unit, receive the notification signaling, where the data selection information carried in the notification signaling is acquiring all six bits of demodulated data as the received data; or when the selection unit selects 256QAM demodulation according to the instruction received by the receiving unit, receive the notification signaling, where the data selection information carried in the notification signaling is acquiring first two bits of data or last two bits of data in eight bits of demodulated data as the received data; or when the selection unit selects 256QAM demodulation according to the instruction received by the receiving unit, receive the notification signaling, where the data selection information carried in the notification signaling is acquiring first four bits of data or last four bits of data in eight bits of demodulated data as the received data; or when the selection unit selects 256QAM demodulation according to the instruction received by the receiving unit, receive the notification signaling, where the data selection information carried in the notification signaling is acquiring first six bits of data or last six bits of data in eight bits of demodulated data as the received data.

In the fourth aspect, and the first, second, and third possible implementation manners of the fourth aspect, a fourth possible implementation manner of the fourth aspect is further provided, and in the fourth possible implementation manner of the fourth aspect, the demodulation unit is configured to: when the receiving unit does not receive a demodulation scheme selection instruction sent by the base station, perform QPSK demodulation on the superposition coding signal.

According to a fifth aspect, the present invention further provides a superposition coding apparatus, where the apparatus is applied on a base station side, and the apparatus includes:

a processor, configured to generate a superposition coding Superposition Coding signal according to bit data to be separately sent to at least two user equipments UEs; and a transmitter, configured to send notification signaling to at least one UE in the at least two UEs, where the notification signaling carries data selection information, and the data selection information is used for instructing the UE to acquire, from bit data demodulated from the superposition coding signal, at least one bit of data that is of a specific quantity and at a specific location as received data, where the transmitter is further configured to send the superposition coding signal to the at least two UEs.

In a first possible implementation manner of the fifth aspect, the transmitter is configured to send radio resource control RRC signaling to the at least two UEs, where the RRC signaling carries the data selection information; or the transmitter is configured to send downlink control information DCI to the at least two UEs, where the DCI carries the data selection information; or the transmitter is configured to send DCI to the at least two UEs, where cyclic redundancy check information CRC in the DCI is scrambled by using a scrambling code, and the scrambling code is used for indicating the data selection information.

In the fifth aspect and the first possible implementation manner of the fifth aspect, a second possible implementation manner of the fifth aspect is further provided, and in the second possible implementation manner of the fifth aspect, the processor is configured to generate information separately used for instructing the at least two UEs to select a respective demodulation scheme; and the transmitter is configured to send, to the at least two UEs, the information that is generated by the processor and separately used for instructing the at least two UEs to select a respective demodulation scheme.

In the second possible implementation manner of the fifth aspect, a third possible implementation manner of the fifth aspect is further provided, and in the third possible implementation manner of the fifth aspect, when a modulation scheme of the superposition coding signal is 16QAM modulation:

the processor is configured to generate information for instructing first UE to select QPSK demodulation, and information for instructing second UE to select 16QAM demodulation; and the transmitter is configured to send, to the first UE, the information that is generated by the processor and for instructing the first UE to select quadrature phase shift keying QPSK demodulation, and send, to the second UE, the information that is generated by the processor and for instructing the second UE to select 16QAM demodulation; or the processor is configured to generate information for instructing first UE to select 16QAM demodulation, and generate information for instructing second UE to select 16QAM demodulation; and the transmitter is configured to send, to the first UE, the information for instructing the first UE to select the 16QAM demodulation, and send, to the second UE, the information for instructing the second UE to select the 16QAM demodulation.

In the third possible implementation manner of the fifth aspect, a fourth possible implementation manner of the fifth aspect is further provided, and in the fourth possible implementation manner of the fifth aspect, the transmitter is configured to send the notification signaling to the first UE and the second UE according to the information for instructing the first UE to select the QPSK demodulation and the information for instructing the second UE to select the 16QAM demodulation that are generated by the processor, where data selection information received by the first UE is used for instructing the first UE to acquire both bits of demodulated data as received data, and data selection information received by the second UE is used for instructing the second UE to acquire last two bits of data in four bits of demodulated data as received data; or the transmitter is configured to send the notification signaling to the first UE and the second UE according to the information for instructing the first UE to select the 16QAM demodulation and the information for instructing the second UE to select the 16QAM demodulation that are generated by the processor, where data selection information received by the first UE is used for instructing the first UE to use first two bits of data in four bits of demodulated data as received data, and data selection information received by the second UE is used for instructing the second UE to use last two bits of data in four bits of demodulated data as received data.

In the second possible implementation manner of the fifth aspect, a fifth possible implementation manner of the fifth aspect is further provided, and in the fifth possible implementation manner of the fifth aspect, when a modulation scheme of the superposition coding signal is 64QAM modulation:

the processor is further configured to generate information for instructing first UE to select QPSK demodulation, and generate information for instructing second UE to select 64QAM demodulation; and the transmitter is further configured to send, to the first UE, the information for instructing the first UE to select the QPSK demodulation, and send, to the second UE, the information for instructing the second UE to select the 64QAM demodulation; or the processor is further configured to generate information for instructing first UE to select 16QAM demodulation, and generate information for instructing second UE to select 64QAM demodulation; and the transmitter is further configured to send, to the first UE, the information for instructing the first UE to select the 16QAM demodulation, and send, to the second UE, the information for instructing the second UE to select the 64QAM demodulation; or the processor is further configured to generate information for instructing first UE to select 64QAM demodulation, and generate information for instructing second UE to select 64QAM demodulation; and the transmitter is further configured to send, to the first UE, the information for instructing the first UE to select the 64QAM demodulation, and send, to the second UE, the information for instructing the second UE to select the 64QAM demodulation.

In the fifth possible implementation manner of the fifth aspect, a sixth possible implementation manner of the fifth aspect is further provided, and in the sixth possible implementation manner of the fifth aspect, the transmitter is configured to send the notification signaling to the first UE and the second UE according to the information for instructing the first UE to select the QPSK demodulation and the information for instructing the second UE to select the 64QAM demodulation that are generated by the processor, where data selection information received by the first UE is used for instructing the first UE to acquire both bits of demodulated data as received data, and data selection information received by the second UE is used for instructing the second UE to acquire last four bits of data in six bits of demodulated data as received data; or the transmitter is configured to send the notification signaling to the first UE and the second UE according to the information for instructing the first UE to select the 16QAM demodulation and the information for instructing the second UE to select the 64QAM demodulation that are generated by the processor, where data selection information received by the first UE is used for instructing the first UE to acquire all four bits of demodulated data as the received data, and data selection information received by the second UE is used for instructing the second UE to acquire last two bits of data in six bits of demodulated data as the received data; or the transmitter is configured to send the notification signaling to the first UE and the second UE according to the information for instructing the first UE to select the 16QAM demodulation and the information for instructing the second UE to select the 64QAM demodulation that are generated by the processor, where data selection information received by the first UE is used for instructing the first UE to acquire first two bits of data in four bits of demodulated data as received data, and data selection information received by the second UE is used for instructing the second UE to acquire last four bits of data in six bits of demodulated data as received data; or the transmitter is configured to send the notification signaling to the first UE and the second UE according to the information for instructing the first UE to select the 64QAM demodulation and the information for instructing the second UE to select the 64QAM demodulation that are generated by the processor, where data selection information received by the first UE is used for instructing the first UE to acquire first two bits of data in six bits of demodulated data as received data, and data selection information received by the second UE is used for instructing the second UE to acquire last four bits of data in six bits of demodulated data as received data; or the transmitter is configured to send the notification signaling to the first UE and the second UE according to the information for instructing the first UE to select the 64QAM demodulation and the information for instructing the second UE to select the 64QAM demodulation that are generated by the processor, where data selection information received by the first UE is used for instructing the first UE to acquire first four bits of data in six bits of demodulated data as received data, and data selection information received by the second UE is used for instructing the second UE to acquire last two bits of data in six bits of demodulated data as received data.

In the second possible implementation manner of the fifth aspect, a seventh possible implementation manner of the fifth aspect is further provided, and in the seventh possible implementation manner of the fifth aspect, when a modulation scheme of the superposition coding signal is 256QAM modulation:

the processor is further configured to generate information for instructing first UE to select QPSK demodulation, and generate information for instructing second UE to select 256QAM demodulation; and the transmitter is further configured to send, to the first UE, the information for instructing the first UE to select the QPSK demodulation, and send, to the second UE, the information for instructing the second UE to select the 256QAM demodulation; or the processor is further configured to generate information for instructing first UE to select 16QAM demodulation, and generate information for instructing second UE to select 256QAM demodulation; and the transmitter is further configured to send, to the first UE, the information for instructing the first UE to select the 16QAM demodulation, and send, to the second UE, the information for instructing the second UE to select the 256QAM demodulation; or the processor is further configured to generate information for instructing first UE to select 64QAM demodulation, and generate information for instructing second UE to select 256QAM demodulation; and the transmitter is further configured to send, to the first UE, the information for instructing the first UE to select the 64QAM demodulation, and send, to the second UE, the information for instructing the second UE to select the 256QAM demodulation; or the processor is configured to generate information for instructing first UE to select 256QAM demodulation, and generate information for instructing second UE to select 256QAM demodulation; and the transmitter is further configured to send, to the first UE, the information for instructing the first UE to select the 256QAM demodulation, and send, to the second UE, the information for instructing the second UE to select the 256QAM demodulation.

In the seventh possible implementation manner of the fifth aspect, an eighth possible implementation manner of the fifth aspect is further provided, and in the eighth possible implementation manner of the fifth aspect, the transmitter is configured to send the notification signaling to the first UE and the second UE according to the information for instructing the first UE to select the QPSK demodulation and the information for instructing the second UE to select the 256QAM demodulation that are generated by the processor, where data selection information received by the first UE is used for instructing the first UE to acquire both bits of demodulated data as received data, and data selection information received by the second UE is used for instructing the second UE to acquire last six bits of data in eight bits of demodulated data as received data; or the transmitter is further configured to send the notification signaling to the first UE and the second UE according to the information for instructing the first UE to select the 16QAM demodulation and the information for instructing the second UE to select the 256QAM demodulation that are generated by the processor, where data selection information received by the first UE is used for instructing the first UE to acquire all four bits of demodulated data as received data, and data selection information received by the second UE is used for instructing the second UE to acquire last four bits of data in eight bits of demodulated data as received data; or the transmitter is further configured to send the notification signaling to the first UE and the second UE according to the information for instructing the first UE to select the 16QAM demodulation and the information for instructing the second UE to select the 256QAM demodulation that are generated by the processor, where data selection information received by the first UE is used for instructing the first UE to acquire first two bits of data in four bits of demodulated data as received data, and data selection information received by the second UE is used for instructing the second UE to acquire last six bits of data in eight bits of demodulated data as received data; or the transmitter is further configured to send the notification signaling to the first UE and the second UE according to the information for instructing the first UE to select the 64QAM demodulation and the information for instructing the second UE to select the 256QAM demodulation that are generated by the processor, where data selection information received by the first UE is used for instructing the first UE to acquire all six bits of demodulated data as received data, and data selection information received by the second UE is used for instructing the second UE to acquire last two bits of data in eight bits of demodulated data as received data; or the transmitter is further configured to send the notification signaling to the first UE and the second UE according to the information for instructing the first UE to select the 64QAM demodulation and the information for instructing the second UE to select the 256QAM demodulation that are generated by the processor, where data selection information received by the first UE is used for instructing the first UE to acquire first two bits of data in six bits of demodulated data as received data, and data selection information received by the second UE is used for instructing the second UE to acquire last six bits of data in eight bits of demodulated data as received data; or the transmitter is further configured to send the notification signaling to the first UE and the second UE according to the information for instructing the first UE to select the 64QAM demodulation and the information for instructing the second UE to select the 256QAM demodulation that are generated by the processor, where data selection information received by the first UE is used for instructing the first UE to acquire first four bits of data in six bits of demodulated data as received data, and data selection information received by the second UE is used for instructing the second UE to acquire last four bits of data in eight bits of demodulated data as received data; or the transmitter is further configured to send the notification signaling to the first UE and the second UE according to the information for instructing the first UE to select the 256QAM demodulation and the information for instructing the second UE to select the 256QAM demodulation that are generated by the processor, where data selection information received by the first UE is used for instructing the first UE to acquire first two bits of data in eight bits of demodulated data as received data, and data selection information received by the second UE is used for instructing the second UE to acquire last six bits of data in eight bits of demodulated data as received data; or the transmitter is further configured to send the notification signaling to the first UE and the second UE according to the information for instructing the first UE to select the 256QAM demodulation and the information for instructing the second UE to select the 256QAM demodulation that are generated by the processor, where data selection information received by the first UE is used for instructing the first UE to acquire first four bits of data in eight bits of demodulated data as received data, and data selection information received by the second UE is used for instructing the second UE to acquire last four bits of data in eight bits of demodulated data as received data; or the transmitter is further configured to send the notification signaling to the first UE and the second UE according to the information for instructing the first UE to select the 256QAM demodulation and the information for instructing the second UE to select the 256QAM demodulation that are generated by the processor, where data selection information received by the first UE is used for instructing the first UE to acquire first six bits of data in eight bits of demodulated data as received data, and data selection information received by the second UE is used for instructing the second UE to acquire last two bits of data in eight bits of demodulated data as received data.

In the second possible implementation manner of the fifth aspect, a ninth possible implementation manner of the fifth aspect is further provided, and in the ninth possible implementation manner of the fifth aspect, when a modulation scheme of the superposition coding signal is 256QAM modulation:

the processor is configured to generate information for instructing first UE to select QPSK demodulation, information for instructing second UE to select 16QAM demodulation, and information for instructing third UE to select 256QAM demodulation; and the transmitter is configured to send, to the first UE, the information for instructing the first UE to select the QPSK demodulation, send, to the second UE, the information for instructing the second UE to select the 16QAM demodulation, and send, to the third UE, the information for instructing the third UE to select the 256QAM demodulation; or the processor is further configured to instruct all of first UE, second UE, and third UE to select 256QAM demodulation; and the transmitter is configured to send, to the first UE, the information for instructing the first UE to select the 256QAM demodulation, send, to the second UE, the information for instructing the second UE to select the 256QAM demodulation, and send, to the third UE, the information for instructing the third UE to select the 256QAM demodulation.

In the ninth possible implementation manner of the fifth aspect, a tenth possible implementation manner of the fifth aspect is further provided, and in the tenth possible implementation manner of the fifth aspect, the transmitter is configured to send the notification signaling to the first UE, the second UE, and the third UE according to the information for instructing the first UE to select the QPSK demodulation, the information for instructing the second UE to select the 16QAM demodulation, and the information for instructing the third UE to select the 256QAM demodulation that are generated by the processor, where data selection information received by the first UE is used for instructing the first UE to acquire both bits of demodulated data as received data, data selection information received by the second UE is used for instructing the second UE to acquire last two bits of data in four bits of demodulated data as received data, and data selection information received by the third UE is used for instructing the third UE to acquire last four bits of data in eight bits of demodulated data as received data; or the transmitter is further configured to send the notification signaling to the first UE, the second UE, and the third UE according to the information for instructing the first UE to select the 256QAM demodulation, the information for instructing the second UE to select the 256QAM demodulation, and the information for instructing the third UE to select the 256QAM demodulation that are generated by the processor, where data selection information received by the first UE is used for instructing the first UE to acquire first two bits of data in eight bits of demodulated data as received data, data selection information received by the second UE is used for instructing the second UE to acquire the third and fourth bits of data in eight bits of demodulated data as received data, and data selection information received by the third UE is used for instructing the third UE to acquire last four bits of data in eight bits of demodulated data as received data.

In the fifth aspect and the first possible implementation manner of the fifth aspect, an eleventh possible implementation manner of the fifth aspect is further provided, and in the eleventh possible implementation manner of the fifth aspect, the apparatus further includes:

a receiver, configured to separately acquire demodulation capability information sent by the at least two UEs; and the transmitter is configured to: when demodulation capability information, acquired by the receiver, of first UE in the at least two UEs is that only QPSK demodulation is supported, skip sending the notification signaling to the first UE.

According to a sixth aspect, the present invention further provides a superposition coding apparatus, where the apparatus is applied on a UE side, and the apparatus includes:

a receiver, configured to receive notification signaling sent by a base station, where the notification signaling carries data selection information, and the data selection information is used for instructing a UE to acquire, from bit data demodulated from a received superposition coding signal, at least one bit of data that is of a specific quantity and at a specific location as received data, where the receiver is further configured to receive the superposition coding signal sent by the base station; and a demodulator, configured to demodulate the superposition coding signal received by the receiver, and acquire, according to the data selection information received by the receiver, the received data from the bit data demodulated from the superposition coding signal.

In a first possible implementation manner of the sixth aspect, the receiver is configured to receive radio resource control RRC signaling sent by the base station, where the RRC signaling carries the data selection information; or the receiver is configured to receive downlink control information DCI sent by the base station, where the DCI carries the data selection information; or the receiver is configured to receive DCI sent by the base station, where cyclic redundancy check information CRC in the DCI is scrambled by using a scrambling code, and the scrambling code is used for indicating the data selection information.

In the six aspect or the first possible implementation manner of the six aspect, a second possible implementation manner of the six aspect is further provided, and in the second possible implementation manner of the six aspect, the apparatus further includes a processor:

the receiver is configured to receive an instruction that is sent by the base station and used for selecting a demodulation scheme;

the processor is configured to select a specific demodulation scheme according to the instruction received by the receiver; and the demodulator is configured to demodulate the superposition coding signal according to the specific demodulation scheme selected by the processor.

In the second possible implementation manner of the sixth aspect, a third possible implementation manner of the sixth aspect is further provided, and in the third possible implementation manner of the sixth aspect, the receiver is configured to:

when the processor selects quadrature phase shift keying QPSK demodulation according to the instruction received by the receiver, receive the notification signaling, where the data selection information carried in the notification signaling is acquiring both bits of demodulated data as the received data; or when the processor selects 16QAM demodulation according to the instruction received by the receiver, receive the notification signaling, where the data selection information carried in the notification signaling is acquiring first two bits of data or last two bits of data in four bits of demodulated data as the received data; or when the processor selects 16QAM demodulation according to the instruction received by the receiver, receive the notification signaling, where the data selection information carried in the notification signaling is acquiring all four bits of demodulated data as the received data; or when the processor selects 64QAM demodulation according to the instruction received by the receiver, receive the notification signaling, where the data selection information carried in the notification signaling is acquiring first two bits of data or last two bits of data in six bits of demodulated data as the received data; or when the processor selects 64QAM demodulation according to the instruction received by the receiver, receive the notification signaling, where the data selection information carried in the notification signaling is acquiring first four bits of data or last four bits of data in six bits of demodulated data as the received data; or when the processor selects 64QAM demodulation according to the instruction received by the receiver, receive the notification signaling, where the data selection information carried in the notification signaling is acquiring all six bits of demodulated data as the received data; or when the processor selects 256QAM demodulation according to the instruction received by the receiver, receive the notification signaling, where the data selection information carried in the notification signaling is acquiring first two bits of data or last two bits of data in eight bits of demodulated data as the received data; or when the processor selects 256QAM demodulation according to the instruction received by the receiver, receive the notification signaling, where the data selection information carried in the notification signaling is acquiring first four bits of data or last four bits of data in eight bits of demodulated data as the received data; or when the processor selects 256QAM demodulation according to the instruction received by the receiver, receive the notification signaling, where the data selection information carried in the notification signaling is acquiring first six bits of data or last six bits of data in eight bits of demodulated data as the received data.

In the sixth aspect, and the first, second, and third possible implementation manners of the sixth aspect, a fourth possible implementation manner of the sixth aspect is further provided, and in the fourth possible implementation manner of the sixth aspect, the demodulator is configured to: when the receiver does not receive a demodulation scheme selection instruction sent by the base station, perform QPSK demodulation on the superposition coding signal.

According to a seventh aspect, the present invention further provides a superposition coding system, where the system includes a base station and at least two user equipments UEs, where the base station is configured to generate a superposition coding Superposition Coding signal according to bit data to be separately sent to the at least two UEs, and send notification signaling to at least one UE in the at least two UEs, where the notification signaling carries data selection information, and the data selection information is used for instructing the UE to acquire, from bit data demodulated from the superposition coding signal, at least one bit of data that is of a specific quantity and at a specific location as received data;

the UE is configured to receive the notification signaling sent by the base station;

the base station is further configured to send the superposition coding signal to the at least two UEs; and the UE is further configured to receive the superposition coding signal sent by the base station, demodulate the superposition coding signal, and acquire, according to the data selection information, the received data from the bit data demodulated from the superposition coding signal.

According to an eighth aspect, the present invention further provides a superposition coding system, where the system includes a base station and at least two user equipments UEs, where the base station is configured to generate a superposition coding Superposition Coding signal according to bit data to be separately sent to the at least two UEs, and send notification signaling to at least one UE in the at least two UEs, where the notification signaling carries data selection information, and the data selection information is used for instructing the UE to acquire, from bit data demodulated from the superposition coding signal, at least one bit of data that is of a specific quantity and at a specific location as received data;

the UE is configured to receive the notification signaling sent by the base station;

the base station is further configured to send the superposition coding signal to the at least two UEs; and the UE is further configured to receive the superposition coding signal sent by the base station, demodulate the superposition coding signal, and acquire, according to the data selection information, the received data from the bit data demodulated from the superposition coding signal.

In the superposition coding method, apparatus, and system provided by the present invention, a base station can generate a superposition coding signal according to bit data to be separately sent to at least two UEs, and then send, to at least one UE in the at least two UEs, notification signaling that carries data selection information, where the data selection information is used for instructing the UE to acquire, from bit data demodulated from the superposition coding signal, at least one bit of data that is of a specific quantity and at a specific location as received data. After receiving the notification signaling and the superposition coding signal that are sent by the base station, the UE demodulates the superposition coding signal, and acquire, according to the data selection information carried in the notification signaling, received data from the bit data demodulated from the superposition coding signal. By using a manner in which the base station instructs the UE to select, from demodulated bit data, bit data that is of a specific quantity and at a specific location, application of a superposition coding technology in communications systems such as an LTE system, a UMTS system, and a CDMA system is implemented.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments with reference to the accompanying drawings in the embodiments. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1A:
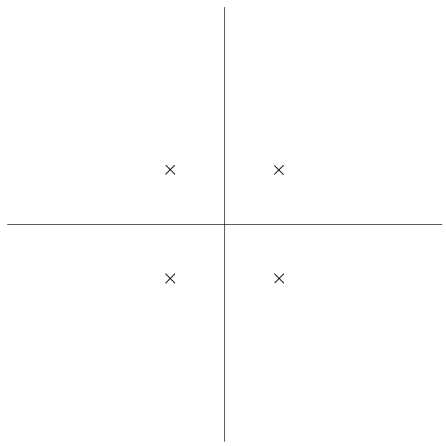
FIG. 1(a) to FIG. 1(d) are constellation diagrams of superposition coding.
Figure 1B:
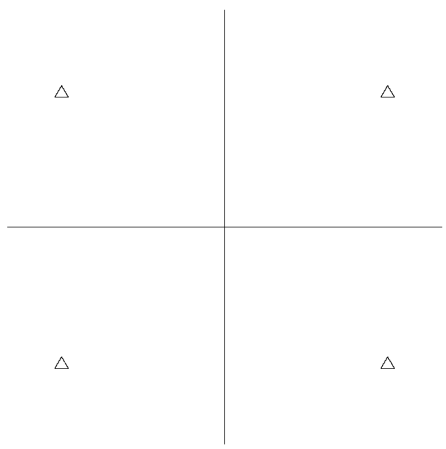
Figures 1C, 1D:
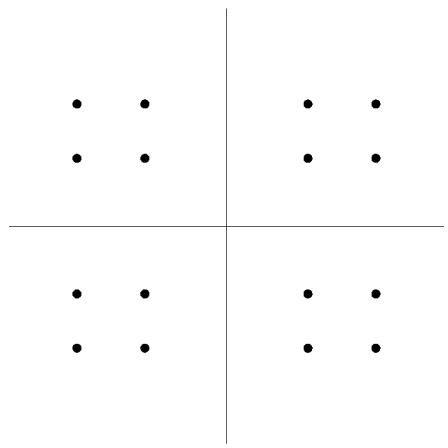

In the present invention, a signal generated by a base station by using a superposition coding technology is referred to as a superposition coding signal. As shown in FIG. 1, that a base station sends a superposition coding signal to two UEs, first UE and second UE, is used as an example, where cross marks in FIG. 1(a) are constellation points of the first UE, and triangle marks in FIG. 1(b) are constellation points of the second UE. Transmit powers corresponding to the cross mark constellation points are greater than transmit powers corresponding to triangle mark constellation points, and after being vector-superposed, the constellation diagrams of the two UEs form a superposed constellation diagram shown in FIG. 1(c), that is, a constellation diagram of the base station is shown in FIG. 1(c). After receiving the superposition coding signal, the first UE and the second UE separately demodulate the superposition coding signal to obtain respective received data. In the superposition coding technology, the base station may use different transmit powers to send multiple data signals to multiple UEs, and use a same time-frequency resource to transmit the multiple data signals. After receiving the superposition coding signal, the UEs demodulate the same superposition coding signal according to different demodulation rules, to obtain respective received data needed by the UEs.

In the following embodiment, an LTE communications system is used as an example for description. In this embodiment, the base station may be an evolved base station (eNB) in the LTE system, and the UE may be a communications apparatus such as a mobile phone. The base station may also be a radio network controller (RNC) in a UMTS communications system, or the like.

Figure 2:
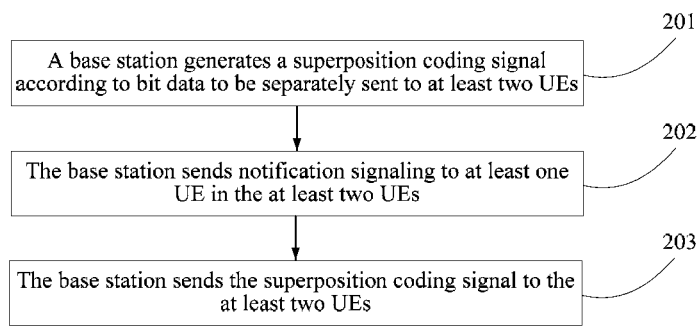
FIG. 2 is a flowchart of a superposition coding method according to an embodiment of the present invention.

This embodiment is described in detail in the following with reference to FIG. 1. This embodiment provides a superposition coding method, where the method may be applied on a base station side, and as shown in FIG. 2, the method includes:

Step 201: A base station generates a superposition coding signal according to bit data to be separately sent to at least two UEs.

Before sending the superposition coding signal to the UEs, the base station may determine a group of UEs that receive the superposition coding signal, and in general cases, the base station selects several UEs having different channel conditions as a group of UEs that receive the superposition coding signal. For example, in a case in which the base station sends the superposition coding signal to two UEs, the base station may set a threshold, and then compare channel quality indicators (CQI) reported by UEs with the threshold; UE with a channel quality indicator greater than the threshold and UE with a channel quality indicator less than the threshold may be grouped into one group to receive the superposition coding signal sent by the base station. In addition, modulation/demodulation capabilities of UEs may also be considered during grouping. For example, some UEs with a limited modulation capability, for example, some machine to machine (M2M) devices, only support QPSK demodulation, and can acquire only a maximum of 2-bit information, and the base station may group the UE that supports only quadrature phase shift keying signal (QPSK) demodulation and UE having a higher demodulation capability, for example, UE that can support a 16 quadrature amplitude modulation (16QAM) demodulation capability into one group.

After performing superposition coding and modulation on signals to be sent to multiple UEs, the base station separately sends a signal to the multiple UEs. For example, the base station superposes a signal 1 to be sent to first UE, a signal 2 to be sent to second UE, and a signal 3 to be sent to third UE, to obtain a superposition coding signal 4, and then separately sends the superposition coding signal 4 to the first UE, the second UE, and the third UE.

In the LTE system, the base station may use any one of the following modulation schemes as a modulation scheme of the superposition coding signal: 16QAM modulation, 64QAM modulation or 256QAM modulation. When the 64QAM modulation is used, one constellation point corresponding to the superposition coding signal that is obtained after modulation by the base station represents six bits of data, that is, $2^6=64$; and when the 256QAM modulation is used, one constellation point corresponding to the superposition coding signal that is obtained after modulation by the base station represents eight bits of data, that is, $2^8=256$.

Generally, transmit powers used when the base station sends the superposition coding signal to the UEs are not selected randomly, and different transmit powers used by the base station for multiple UEs have a fixed ratio; for example, when the base station uses 16QAM modulation, a ratio between two transmit powers used by the base station should be 4:1.

Step 202: The base station sends notification signaling to at least one UE in the at least two UEs.

The base station adds data selection information to the notification signaling, where the data selection information is used for instructing the UE to acquire, from demodulated bit data, at least one bit of data that is of a specific quantity and at a specific location as received data.

In this embodiment, the specific quantity may be an even-numbered quantity of bit data, for example, 2 bits, 4 bits or 6 bits, and the specific location may refer to: starting from the first bit of data of a demodulated coding signal, sequentially acquiring bit data; for example, starting from the first bit of data of the coding signal, acquiring two bits of data, that is, the first bit of data and the second bit of data.

For example, when the UE uses 16QAM demodulation (where correspondingly, four bits of data are obtained by means of demodulation), the base station may use the data selection information to instruct the UE to acquire last two bits of data in four bits of data as received data. The base station may separately send one piece of notification signaling to each UE of the at least one UE, where each piece of signaling carries data selection information corresponding to the UE. As another implementation manner, the base station may also add, to one piece of notification signaling, multiple pieces of data selection information corresponding to multiple UEs, and then broadcast or multicast the piece of notification signaling to the multiple UEs. This embodiment does not limit a manner in which the base station sends the notification signaling.

When the demodulation scheme used by the UE is binary phase shift keying (BPSK), the UE may acquire 1 bit from demodulated bit data as received data.

The notification signaling may not be sent to all the UEs. For example, when a communications system supports only a QPSK demodulation scheme, that is, all the UEs use the QPSK demodulation scheme for demodulation, the base station may not need to send the notification signaling to the UEs, and by default, the UEs may acquire all bits that can be obtained after demodulation as received data.

In addition, the notification information may not be sent to some UEs with a limited modulation/demodulation capability or with a default modulation scheme. When UE can support only the modulation/demodulation scheme QPSK, the base station may not need to send notification signaling to the UE, and by default, the UE may acquire all bits that can be obtained after demodulation as received data. For example, some MTC devices support only a lowest QPSK modulation/demodulation scheme, and before registration or setup of an RRC connection, the MTC devices report modulation/demodulation capabilities of the MTC devices to the base station. After receiving a signal sent by the base station, these M2M devices demodulate the received signal according to QPSK by default, and acquire all bits that can be obtained after demodulation as received data; or for some UEs whose default modulation scheme is the QPSK modulation/demodulation scheme, when the base station does not send any notification signaling, the UEs demodulate the received signal according to QPSK by default, and acquire all bits that can be obtained after demodulation as received data.

Specifically, an implementation manner of sending, by the base station, the notification signaling to the UE may be any one of the following three manners:

1) The base station sends radio resource control (RRC) signaling to the at least two UEs, where the RRC signaling carries data selection information.

2) The base station sends newly defined downlink control information (DCI) signaling to the at least two UEs, where the DCI includes a field for instructing UE to acquire received data, where the field carries the data selection information.

3) The base station sends DCI to the at least two UEs, where cyclic redundancy check (CRC) information in the DCI is scrambled by using a scrambling code, and the scrambling code is used for indicating the data selection information.

It should be noted that, to reduce transmission resources, generally, the base station allocates all modulated bit data to multiple UEs, that is, a sum of bits of bit data obtained by the multiple UEs is the same as a quantity of bits corresponding to a modulation scheme used by the base station. For example, when a modulation scheme of the base station is 64QAM, a quantity of bits obtained after modulation by the base station is 6. In a scenario of two UEs, the base station instructs the first UE to acquire first two bits of data in six bits of data, and instructs the second UE to acquire last four bits of data in the six bits of data. Alternatively, when a modulation scheme of the base station is 256QAM, a quantity of bits obtained after modulation is 8. Still, in the scenario of two UEs, the base station instructs the first UE to acquire first six bits of data in eight bits of data, and instructs the second UE to acquire last two bits of data in the eight bits of data.

Optionally, before step 202, the base station may further instruct the at least one UE to select a specific demodulation scheme, for example, QPSK demodulation, 16 quadrature amplitude modulation QAM demodulation, 64QAM demodulation or 256QAM demodulation.

In addition, the base station may not send the notification information to some UEs with a limited modulation/demodulation capability or with a default modulation scheme. When UE can support only the modulation/demodulation scheme QPSK, the base station may not send the notification signaling to the UE, and by default, the UE may acquire all bits that can be obtained after demodulation as received data. For example, some MTC devices support only a lowest QPSK modulation/demodulation scheme, and before registration or setup of an RRC connection, the MTC devices report modulation/demodulation capabilities of the MTC devices to the base station. After receiving a signal sent by the base station, these M2M devices demodulate the received signal according to QPSK by default, and acquire all bits that can be obtained after demodulation as received data; or for some UEs whose default modulation scheme is the QPSK modulation/demodulation scheme, when the base station does not send any notification signaling, the UEs demodulate the received signal according to QPSK by default, and acquire all bits that can be obtained after demodulation as received data.

In this embodiment, the base station may instruct multiple UEs to perform modulation according to a same demodulation scheme, or may instruct multiple UEs to perform demodulation according to different demodulation schemes. For example, when the modulation scheme is 16QAM, the base station may instruct both the first UE and the second UE to select 16QAM demodulation, and after four bits of data are obtained by means of demodulation, the base station instructs the first UE to acquire first two bits of data in the four bits of data as received data, and instructs the second UE to acquire last two bits of data in the four bits of data as received data; or the base station may also instruct the first UE to select QPSK demodulation and to use both bits of demodulated data as received data, and instruct the second UE to select 16QAM demodulation and to use last two bits of data in four bits of demodulated data as received data. This embodiment does not limit an implementation manner in which the base station instructs UE to select a demodulation scheme.

In FIG. 1(c), the second UE having better channel quality needs to detect a quadrant in which a constellation point of the second UE is located, that is, the second UE needs to demodulate the superposition coding signal to obtain 2-bit information for marking the quadrant; the first UE with poorer channel quality needs to detect which specific constellation point in the quadrant is a constellation point of the first UE, that is, the first UE needs to demodulate the superposition coding signal to obtain at least two bits of information for marking the constellation point. By using an example in which the base station uses 16QAM modulation to modulate the superposition coding signal: a constellation diagram corresponding to the base station is shown in FIG. 1(d), where the base station obtains 16 constellation points by means of 16QAM modulation, and each constellation point is uniquely identified by using four bits of data. After the second UE with better channel quality receives the superposition coding signal, the base station instructs the second UE to perform 16QAM demodulation on the superposition coding signal, and instructs the second UE to use last two bits of data "10" of four bits of demodulated data as received data, where the two bits of data "10" represent that a constellation point of the second UE is located in a second quadrant identified by "10"; after the first UE with poorer channel quality receives the superposition coding signal, the base station instructs the first UE to perform QPSK demodulation on the superposition coding signal, and instructs the first UE to acquire both bits of demodulated data "00" as received data, where the two bits of data "00" represent that the constellation point of the first UE is a constellation point identified by "1000" in the second quadrant.

Step 203: The base station sends the superposition coding signal to the at least two UEs.

The base station sends the superposition coding signal to the at least two UEs, so that the at least two UEs separately demodulate the received superposition coding signal, and that the at least one UE in the at least two UEs acquires, from demodulated bit data and according to the notification signaling received in step 202, at least one bit of data that is of a specific quantity and at a specific location as received data.

In the superposition coding method provided by this embodiment of the present invention, a base station can send a superposition coding signal to at least two UEs, and then send, to the at least two UEs, notification signaling that carries data selection information, where the data selection information is used for instructing the UE to acquire, from demodulated bit data, at least one bit of data that is of a specific quantity and at a specific location as received data. After receiving the notification signaling, each UE acquires, from the demodulated bit data and according to the data selection information, at least one bit of data as the received data. By using a manner in which the base station instructs the UE to select, from demodulated bit data, bit data that is of a specific quantity and at a specific location, application of a superposition coding technology in communications systems such as an LTE system, a UMTS system, and a CDMA system is implemented.

In addition, in the prior art, to avoid demodulation interference between the first UE and the second UE, the second UE with better channel quality needs to have a successive interference cancellation (Successive Interference Cancellation, SIC for short) function. In the superposition coding method provided by this embodiment, because the base station notifies, by sending notification signaling, each UE of bits that need to be acquired as received data, demodulation interference between UEs may be avoided; therefore, the UE does not need to have the SIC function, and restrictive requirements of the superposition coding technology on UE functions can be reduced.

Figure 3:
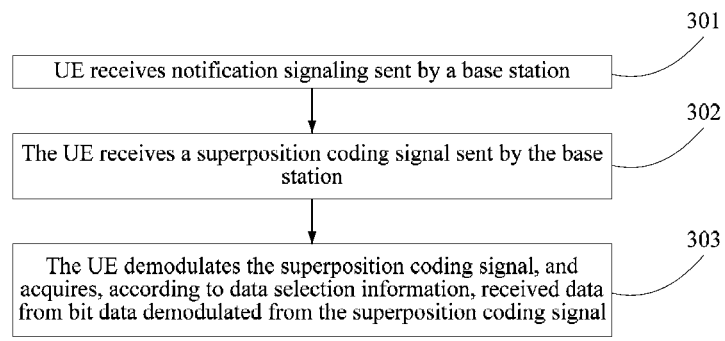
FIG. 3 is a flowchart of another superposition coding method according to an embodiment of the present invention.

This embodiment further provides a superposition coding method, where the method may be applied on a UE side, and as shown in FIG. 3, the method includes:

Step 301: UE receives notification signaling sent by a base station.

The notification signaling carries data selection information that is used for instructing the UE to acquire, from demodulated bit data, at least one bit of data that is of a specific quantity and at a specific location as received data. For example, when the UE uses 16QAM demodulation (where correspondingly, four bits of data are obtained by means of demodulation), the base station may use the data selection information to instruct the UE to acquire last two bits of data in four bits of data as received data.

Specifically, an implementation manner of receiving, by the UE, the notification signaling sent by the base station may be any one of the following three manners:

1) The UE receives RRC signaling sent by the base station, where the RRC signaling carries the data selection information.

2) The UE receives newly defined DCI sent by the base station, where the DCI includes a field for instructing the UE to acquire received data, and the field carries the data selection information.

3) The UE receives DCI sent by the base station, where CRC information in the DCI is scrambled by using a scrambling code, and the scrambling code is used for indicating the data selection information.

Step 302: The UE receives a superposition coding signal sent by the base station.

Step 303: The UE demodulates the superposition coding signal, and acquires, according to data selection information, received data from bit data demodulated from the superposition coding signal.

A demodulation scheme that may be used by the UE includes any one of the following demodulation schemes: QPSK demodulation, 16QAM demodulation, 64QAM demodulation and 256QAM demodulation.

In this embodiment, the demodulation scheme used by the UE may be a demodulation scheme that is previously informed of by the base station and used by the UE as a default configuration, or may be a demodulation scheme temporarily informed of by the base station. Optionally, before demodulating the superposition coding signal sent by the base station, the UE may receive instruction signaling sent by the base station, select a specific demodulation scheme according to an instruction of the base station, and then demodulate, according to the specific demodulation scheme, the superposition coding signal sent by the base station.

When the base station instructs the UE to use 16QAM demodulation, the data selection information is acquiring last two bits of data in four bits of demodulated data as the received data, and the UE acquires, according to the data selection information, two bits of data at a specific location. Alternatively, when the base station instructs the UE to use QPSK demodulation, the data selection information is acquiring both bits of demodulated data as the received data, and the UE acquires, according to the data selection information, two bits of data at a specific location. This embodiment does not limit specific content of the data selection information.

Exemplarily, for different demodulation schemes, the specific content of the data selection information may include:

1) When a demodulation scheme indicated by the base station is QPSK demodulation, the data selection information is acquiring both bits of demodulated data as the received data.

2) When a demodulation scheme indicated by the base station is 16QAM demodulation, the data selection information is acquiring first two bits of data or last two bits of data in four bits of demodulated data as the received data; or the data selection information is acquiring all four bits of demodulated data as the received data.

3) When a demodulation scheme indicated by the base station is 64QAM demodulation, the data selection information is acquiring first two bits of data or last two bits of data in six bits of demodulated data as the received data; or the data selection information is acquiring first four bits of data or last four bits of data in six bits of demodulated data as the received data; or the data selection information is acquiring all six bits of demodulated data as the received data.

4) When a demodulation scheme indicated by the base station is 256QAM demodulation, the data selection information is acquiring first two bits of data or last two bits of data in eight bits of demodulated data as the received data; or the data selection information is acquiring first four bits of data or last four bits of data in eight bits of demodulated data as the received data; or the data selection information is acquiring first six bits of data or last six bits of data in eight bits of demodulated data as the received data.

After receiving the notification signaling carrying the data selection information, the UE executes an instruction of the data selection information, and acquires, according to a specific quantity and a specific location indicated by the data selection information, at least one bit of data from the demodulated bit data as the received data.

Optionally, when a demodulation scheme selection instruction sent by the base station is not received, the UE performs QPSK demodulation on the superposition coding signal by default.

In the superposition coding method provided by this embodiment of the present invention, UE can receive a superposition coding signal sent by a base station, and then receive notification signaling that is sent by the base station and carries data selection information, where the data selection information is used for instructing the UE to acquire, from demodulated bit data, at least one bit of data that is of a specific quantity and at a specific location as received data. After receiving the notification signaling, the UE acquires, according to the data selection information, at least one bit of data from the demodulated bit data as the received data. By using a manner in which the base station instructs the UE to select, from demodulated bit data, bit data that is of a specific quantity and at a specific location, application of a superposition coding technology in communications systems such as an LTE system, a UMTS system, and a CDMA system is implemented.

In addition, in the superposition coding method provided by this embodiment, because the UE acquires, by receiving the notification signaling, the data selection information for indicating reception of specific bits, demodulation interference between UEs may be avoided; therefore, the UE does not need to have a SIC function, and restrictive requirements of the superposition coding technology on UE functions can be reduced.

A quantity of UEs involved in the superposition coding technology used in an LTE system may be two or greater than two. This embodiment is described in detail and further expanded in the following by using a two-UE scenario as an example and with reference to the implementation manners shown in FIG. 2 and FIG. 3. With reference to the two-UE scenario, a scenario in which a quantity of UEs is three or more may be implemented without creative effort.

First: when the base station uses 16QAM modulation for the superposition coding signal:

1) The base station instructs the first UE to select QPSK demodulation, instructs the second UE to select 16QAM demodulation, and then sends the notification signaling to the first UE and the second UE, where data selection information received by the first UE is used for instructing the first UE to acquire both bits of demodulated data as received data, and data selection information received by the second UE is used for instructing the second UE to acquire last two bits of data in four bits of demodulated data as received data. A modulation/demodulation effect is equivalent to 16QAM=>QPSK+QPSK, where the left of the equation represents that the base station obtains four bits of data by means of 16QAM modulation; the first QPSK on the right of the equation represents that the first UE uses QPSK demodulation to obtain both bits of data; and the second QPSK on the right of the equation represents that the second UE uses 16QAM demodulation, to obtain last two bits of data in four bits of data, which is equivalent to that the second UE uses QPSK demodulation.

2) The base station instructs both the first UE and the second UE to select 16QAM demodulation, and then sends the notification signaling to the first UE and the second UE, where data selection information received by the first UE is used for instructing the first UE to use first two bits of data in four bits of demodulated data as received data, and data selection information received by the second UE is used for instructing the second UE to use last two bits of data in four bits of demodulated data as received data. A modulation/demodulation effect is equivalent to 16QAM=>QPSK+QPSK, where the left of the equation represents that the base station obtains four bits of data by means of 16QAM modulation; the first QPSK on the right of the equation represents that the first UE uses 16QAM demodulation to obtain first two bits of data in four bits of data, which is equivalent to that the first UE uses QPSK demodulation; and the second QPSK on the right of the equation represents that the second UE uses 16QAM demodulation, to obtain last two bits of data in four bits of data, which is equivalent to that the second UE uses QPSK demodulation.

Second: when the base station uses 64QAM modulation for the superposition coding signal:

1) The base station instructs the first UE to select QPSK demodulation, instructs the second UE to select 64QAM demodulation, and then sends the notification signaling to the first UE and the second UE, where data selection information received by the first UE is used for instructing the first UE to acquire both bits of demodulated data as received data, and data selection information received by the second UE is used for instructing the second UE to acquire last four bits of data in six bits of demodulated data as received data. A modulation/demodulation effect is equivalent to 64QAM=>QPSK+16QAM, where the left of the equation represents that the base station obtains six bits of data by means of 64QAM modulation; the QPSK on the right of the equation represents that the first UE uses QPSK demodulation to obtain both bits of data; and the 16QAM on the right of the equation represents that the second UE uses 64QAM demodulation, to obtain last four bits of data in six bits of data, which is equivalent to that the second UE uses 16QAM demodulation.

2) The base station instructs the first UE to select 16QAM demodulation, instructs the second UE to select 64QAM demodulation, and then sends the notification signaling to the first UE and the second UE, where data selection information received by the first UE is used for instructing the first UE to acquire all four bits of demodulated data as received data, and data selection information received by the second UE is used for instructing the second UE to acquire last two bits of data in six bits of demodulated data as received data. A modulation/demodulation effect is equivalent to 64QAM=>16QAM+QPSK, where the left of the equation represents that the base station obtains six bits of data by means of 64QAM modulation; the 16QAM on the right of the equation represents that the first UE uses 16QAM demodulation to obtain all four bits of data; and the QPSK on the right of the equation represents that the second UE uses 64QAM demodulation, to obtain last two bits of data in six bits of data, which is equivalent to that the second UE uses QPSK demodulation.

3) The base station instructs the first UE to select 16QAM demodulation, instructs the second UE to select 64QAM demodulation, and then sends the notification signaling to the first UE and the second UE, where data selection information received by the first UE is used for instructing the first UE to acquire first two bits of data in four bits of demodulated data as received data, and data selection information received by the second UE is used for instructing the second UE to acquire last four bits of data in six bits of demodulated data as received data. A modulation/demodulation effect is equivalent to 64QAM=>QPSK+16QAM, where the left of the equation represents that the base station obtains six bits of data by means of 64QAM modulation; the QPSK on the right of the equation represents that the first UE uses 16QAM demodulation to obtain first two bits of data in four bits of data, which is equivalent to that the first UE uses QPSK demodulation; and the 16QAM on the right of the equation represents that the second UE uses 64QAM demodulation, to obtain last four bits of data in six bits of data, which is equivalent to that the second UE uses 16QAM demodulation.

4) The base station instructs both the first UE and the second UE to select 64QAM demodulation, and then sends the notification signaling to the first UE and the second UE, where data selection information received by the first UE is used for instructing the first UE to acquire first two bits of data in six bits of demodulated data as received data, and data selection information received by the second UE is used for instructing the second UE to acquire last four bits of data in six bits of demodulated data as received data. A modulation/demodulation effect is equivalent to 64QAM=>QPSK+16QAM, where the left of the equation represents that the base station obtains six bits of data by means of 64QAM modulation; the QPSK on the right of the equation represents that the first UE uses 64QAM demodulation to obtain first two bits of data in six bits of data, which is equivalent to that the first UE uses QPSK demodulation; and the 16QAM on the right of the equation represents that the second UE uses 64QAM demodulation, to obtain last four bits of data in six bits of data, which is equivalent to that the second UE uses 16QAM demodulation.

5) The base station instructs both the first UE and the second UE to select 64QAM demodulation, and then sends the notification signaling to the first UE and the second UE, where data selection information received by the first UE is used for instructing the first UE to acquire first four bits of data in six bits of demodulated data as received data, and data selection information received by the second UE is used for instructing the second UE to acquire last two bits of data in six bits of demodulated data as received data. A modulation/demodulation effect is equivalent to 64QAM=>16QAM+QPSK, where the left of the equation represents that the base station obtains six bits of data by means of 64QAM modulation; the 16QAM on the right of the equation represents that the first UE uses 64QAM demodulation to obtain first four bits of data in six bits of data, which is equivalent to that the first UE uses 16QAM demodulation; and the QPSK on the right of the equation represents that the second UE uses 64QAM demodulation, to obtain last two bits of data in six bits of data, which is equivalent to that the second UE uses QPSK demodulation.

Third: when the base station uses 256QAM modulation for the superposition coding signal:

1) The base station instructs the first UE to select QPSK demodulation, instructs the second UE to select 256QAM demodulation, and then sends the notification signaling to the first UE and the second UE, where data selection information received by the first UE is used for instructing the first UE to acquire both bits of demodulated data as received data, and data selection information received by the second UE is used for instructing the second UE to acquire last six bits of data in eight bits of demodulated data as received data. A modulation/demodulation effect is equivalent to 256QAM=>QPSK+64QAM, where the left of the equation represents that the base station obtains eight bits of data by means of 256QAM modulation; the QPSK on the right of the equation represents that the first UE uses QPSK demodulation to obtain both bits of data; and the 64QAM on the right of the equation represents that the second UE uses 256QAM demodulation, to obtain last six bits of data in eight bits of data, which is equivalent to that the second UE uses 64QAM demodulation.

2) The base station instructs the first UE to select 16QAM demodulation, instructs the second UE to select 256QAM demodulation, and then sends the notification signaling to the first UE and the second UE, where data selection information received by the first UE is used for instructing the first UE to acquire all four bits of demodulated data as received data, and data selection information received by the second UE is used for instructing the second UE to acquire last four bits of data in eight bits of demodulated data as received data. A modulation/demodulation effect is equivalent to 256QAM=>16QAM+16QAM, where the left of the equation represents that the base station obtains eight bits of data by means of 256QAM modulation; the first 16QAM on the right of the equation represents that the first UE uses 16QAM demodulation to obtain all four bits of data; and the second 16QAM on the right of the equation represents that the second UE uses 256QAM demodulation, to obtain last four bits of data in eight bits of data, which is equivalent to that the second UE uses 16QAM demodulation.

3) The base station instructs the first UE to select 16QAM demodulation, instructs the second UE to select 256QAM demodulation, and then sends the notification signaling to the first UE and the second UE, where data selection information received by the first UE is used for instructing the first UE to acquire first two bits of data in four bits of demodulated data as received data, and data selection information received by the second UE is used for instructing the second UE to acquire last six bits of data in eight bits of demodulated data as received data. A modulation/demodulation effect is equivalent to 256QAM=>QPSK+64QAM, where the left of the equation represents that the base station obtains eight bits of data by means of 256QAM modulation; the QPSK on the right of the equation represents that the first UE uses 16QAM demodulation to obtain first two bits of data in four bits of data, which is equivalent to that the first UE uses QPSK demodulation; and the 64QAM on the right of the equation represents that the second UE uses 256QAM demodulation, to obtain last six bits of data in eight bits of data, which is equivalent to that the second UE uses 64QAM demodulation.

4) The base station instructs the first UE to select 64QAM demodulation, instructs the second UE to select 256QAM demodulation, and then sends the notification signaling to the first UE and the second UE, where data selection information received by the first UE is used for instructing the first UE to acquire all six bits of demodulated data as received data, and data selection information received by the second UE is used for instructing the second UE to acquire last two bits of data in eight bits of demodulated data as received data. A modulation/demodulation effect is equivalent to 256QAM=>64QAM+QPSK, where the left of the equation represents that the base station obtains eight bits of data by means of 256QAM modulation; the 64QAM on the right of the equation represents that the first UE uses 64QAM demodulation to obtain all six bits of data; and the QPSK on the right of the equation represents that the second UE uses 256QAM demodulation, to obtain last two bits of data in eight bits of data, which is equivalent to that the second UE uses QPSK demodulation.

5) The base station instructs the first UE to select 64QAM demodulation, instructs the second UE to select 256QAM demodulation, and then sends the notification signaling to the first UE and the second UE, where data selection information received by the first UE is used for instructing the first UE to acquire first two bits of data in six bits of demodulated data as received data, and data selection information received by the second UE is used for instructing the second UE to acquire last six bits of data in eight bits of demodulated data as received data. A modulation/demodulation effect is equivalent to 256QAM=>QPSK+64QAM, where the left of the equation represents that the base station obtains eight bits of data by means of 256QAM modulation; the QPSK on the right of the equation represents that the first UE uses 64QAM demodulation to obtain first two bits of data in six bits of data, which is equivalent to that the first UE uses QPSK demodulation; and the 64QAM on the right of the equation represents that the second UE uses 256QAM demodulation, to obtain last six bits of data in eight bits of data, which is equivalent to that the second UE uses 64QAM demodulation.

6) The base station instructs the first UE to select 64QAM demodulation, instructs the second UE to select 256QAM demodulation, and then sends the notification signaling to the first UE and the second UE, where data selection information received by the first UE is used for instructing the first UE to acquire first four bits of data in six bits of demodulated data as received data, and data selection information received by the second UE is used for instructing the second UE to acquire last four bits of data in eight bits of demodulated data as received data. A modulation/demodulation effect is equivalent to 256QAM=>16QAM+16QAM, where the left of the equation represents that the base station obtains eight bits of data by means of 256QAM modulation;

the first 16QAM on the right of the equation represents that the first UE uses 64QAM demodulation to obtain first four bits of data in six bits of data, which is equivalent to that the first UE uses 16QAM demodulation; and the second 16QAM on the right of the equation represents that the second UE uses 256QAM demodulation, to obtain last four bits of data in eight bits of data, which is equivalent to that the second UE uses 16QAM demodulation.

7) The base station instructs both the first UE and the second UE to select 256QAM demodulation, and then sends the notification signaling to the first UE and the second UE, where data selection information received by the first UE is used for instructing the first UE to acquire first two bits of data in eight bits of demodulated data as received data, and data selection information received by the second UE is used for instructing the second UE to acquire last six bits of data in eight bits of demodulated data as received data. A modulation/demodulation effect is equivalent to 256QAM=>QPSK+64QAM, where the left of the equation represents that the base station obtains eight bits of data by means of 256QAM modulation; the QPSK on the right of the equation represents that the first UE uses 256QAM demodulation to obtain first two bits of data in eight bits of data, which is equivalent to that the first UE uses QPSK demodulation; and the 64QAM on the right of the equation represents that the second UE uses 256QAM demodulation, to obtain last six bits of data in eight bits of data, which is equivalent to that the second UE uses 64QAM demodulation.

8) The base station instructs both the first UE and the second UE to select 256QAM demodulation, and then sends the notification signaling to the first UE and the second UE, where data selection information received by the first UE is used for instructing the first UE to acquire first four bits of data in eight bits of demodulated data as received data, and data selection information received by the second UE is used for instructing the second UE to acquire last four bits of data in eight bits of demodulated data as received data. A modulation/demodulation effect is equivalent to 256QAM=>16QAM+16QAM, where the left of the equation represents that the base station obtains eight bits of data by means of 256QAM modulation; the first 16QAM on the right of the equation represents that the first UE uses 256QAM demodulation to obtain first four bits of data in eight bits of data, which is equivalent to that the first UE uses 16QAM demodulation; and the second 16QAM on the right of the equation represents that the second UE uses 256QAM demodulation, to obtain last four bits of data in eight bits of data, which is equivalent to that the second UE uses 16QAM demodulation.

9) The base station instructs both the first UE and the second UE to select 256QAM demodulation, and then sends the notification signaling to the first UE and the second UE, where data selection information received by the first UE is used for instructing the first UE to acquire first six bits of data in eight bits of demodulated data as received data, and data selection information received by the second UE is used for instructing the second UE to acquire last two bits of data in eight bits of demodulated data as received data. A modulation/demodulation effect is equivalent to 256QAM=>64QAM+QPSK, where the left of the equation represents that the base station obtains eight bits of data by means of 256QAM modulation; the 64QAM on the right of the equation represents that the first UE uses 256QAM demodulation to obtain first six bits of data in eight bits of data, which is equivalent to that the first UE uses 64QAM demodulation; and the QPSK on the right of the equation represents that the second UE uses 256QAM demodulation, to obtain last two bits of data in eight bits of data, which is equivalent to that the second UE uses QPSK demodulation.

Optionally, the base station may also acquire channel quality information of the UE, and instruct, according to an indication of channel quality, the UE to select a specific demodulation scheme. Specifically, the base station first acquires channel quality information of two UEs, and then compares the acquired two pieces of channel quality information, to determine UE with poorer channel quality and UE with better channel quality. Preferably, for the UE with poorer channel quality, the base station instructs the UE to select a lowest demodulation scheme that can meet a quantity of bits that the UE needs to acquire; in this embodiment, demodulation scheme levels in ascending order are as follows: QPSK, 16QAM, 64QAM, and 256QAM. For example, when the base station allocates four bits of data to the UE with poorer channel quality, the base station instructs the UE to select 16QAM demodulation rather than instructing the UE to select 64QAM demodulation or 256QAM demodulation, that is, for the UE with poorer channel quality, the base station performs processing according to the foregoing processing manner for the first UE.

Description is made above by using an example in which two UEs participate in a superposition coding technology in an LTE system. For a case in which three UEs participate in the superposition coding technology, this embodiment further provides two implementation manners. It should be noted that, the two implementation manners are merely exemplary description, but do not serve as a limitation to all implementation manners in the scenario involving three UEs:

Manner 1

When the base station uses 256QAM modulation for the superposition coding signal, the base station instructs first UE with poorest channel quality to select QPSK demodulation, and sends the notification signaling to the first UE, where data selection information received by the first UE is used for instructing the first UE to acquire both bits of demodulated data as received data; the base station instructs second UE with second poorest channel quality to select 16QAM demodulation, and sends the notification signaling to the second UE, where data selection information received by the second UE is used for instructing the second UE to acquire last two bits of data in four bits of demodulated data as received data; and the base station instructs third UE with best channel quality to select 256QAM demodulation, and sends the notification signaling to the third UE, where data selection information received by the third UE is used for instructing the third UE to acquire last four bits of data in eight bits of demodulated data as received data.

Manner 2

When the base station uses 256QAM modulation for the superposition coding signal, the base station instructs first UE with poorest channel quality to select 256QAM demodulation, and sends the notification signaling to the first UE, where data selection information received by the first UE is used for instructing the first UE to acquire first two bits of data in eight bits of demodulated data as received data; the base station instructs second UE with second poorest channel quality to select 256QAM demodulation, and sends the notification signaling to the second UE, where data selection information received by the second UE is used for instructing the second UE to acquire the third and fourth bits of data in eight bits of demodulated data as received data; and the base station instructs third UE with best channel quality to select 256QAM demodulation, and sends the notification signaling to the third UE, where data selection information received by the third UE is used for instructing the third UE to acquire last four bits of data in eight bits of demodulated data as received data.

Further, before sending the notification signaling to the UEs, the base station may further separately acquire demodulation capability information sent by the at least two UEs, and when demodulation capability information of first UE in the at least two UEs is that only QPSK demodulation is supported, the base station does not send the notification signaling to the first UE, so that the first UE performs QPSK demodulation by default.

Further, as elaboration of step 202 in FIG. 2, the data selection information added by the base station to the notification signaling may be specifically one or more bits, or a scrambling code. When the data selection information is a flag bit, a correspondence between a bit and a selection manner is exemplarily shown in Table 1:

TABLE 1

| Bit | Selection manner |
| --- | --- |
| 0 | Take all |
| 1 | Take last two bits of data |

Alternatively, the correspondence is shown in Table 2:

TABLE 2

| Bit | Selection manner |
| --- | --- |
| 00 | Take all |
| 01 | Take first two bits of data |
| 10 | Take last two bits of data |
| 11 | Reserved |

Further alternatively, the correspondence is shown in Table 3:

TABLE 3

| Bit | Selection manner |
| --- | --- |
| 000 | Take all |
| 001 | Take first two bits of data |
| 010 | Take last two bits of data |
| 011 | Take first four bits of data |
| 100 | Take last four bits of data |
| 101 | Take first six bits of data |
| 110 | Take last six bits of data |
| 111 | Reserved |

When the data selection information is a scrambling code, a correspondence between a scrambling code and a selection manner is exemplarily shown in Table 4:

TABLE 4

| Bit | Selection manner |
| --- | --- |
| a | Take all |
| b | Take last two bits of data |

Alternatively, the correspondence is shown in Table 5:

TABLE 5

| Bit | Selection manner |
| --- | --- |
| a | Take all |
| b | Take first two bits of data |

TABLE 5-continued

| Bit | Selection manner |
| --- | --- |
| c | Take last two bits of data |
| d | Reserved |

Further alternatively, the correspondence is shown in Table 6:

TABLE 6

| Bit | Selection manner |
| --- | --- |
| a | Take all |
| b | Take first two bits of data |
| c | Take last two bits of data |
| d | Take first four bits of data |
| e | Take last four bits of data |
| f | Take first six bits of data |
| g | Take last six bits of data |
| h | Reserved |

In this embodiment, in a case in which all bits of data are selected, the base station may send take-all data selection information to the UE, or may send, to the UE, non-take-all data selection information that achieves a same effect as the take-all data selection information. By using a bit as an example, when the base station instructs the UE to acquire both bits of data that are obtained by means of QPSK demodulation as received data, referring to Table 1, the base station may send a bit "0" as the data selection information to the UE, or may send a bit "1" as the data selection information to the UE, where for QPSK demodulation, an indication effect of the bit "1" is the same as an indication effect of the bit "0".

In the superposition coding method provided by this embodiment of the present invention, a base station can send a superposition coding signal to at least two UEs, and then send, to the at least two UEs, notification signaling that carries data selection information, where the data selection information is used for instructing the UE to acquire, from demodulated bit data, at least one bit of data that is of a specific quantity and at a specific location as received data. After receiving the notification signaling, each UE acquires, according to the data selection information, at least one bit of data from demodulated bit data as the received data. In this way, by using a manner in which the base station instructs the UE to receive specific bit data, application of a superposition coding technology in systems such as an LTE system, a UMTS system, and a CDMA system is implemented.

In addition, in the prior art, to avoid demodulation interference between first UE and second UE, the second UE with better channel quality needs to have a SIC function. In the superposition coding method provided by this embodiment, because the base station notifies, by sending notification signaling, each UE of bits that need to be acquired as received data, demodulation interference between UEs may be avoided; therefore, the UE does not need to have the SIC function, and restrictive requirements of the superposition coding technology on UE functions can be reduced.

Figure 4:
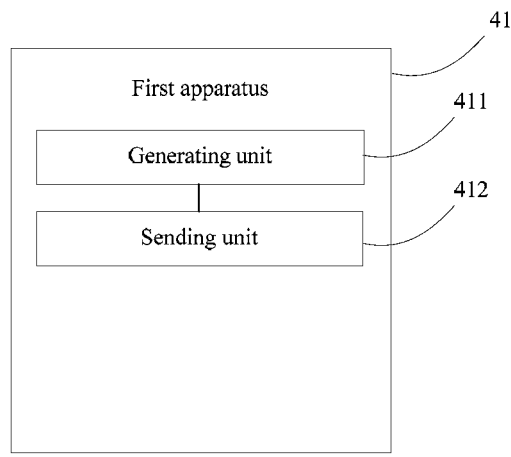
FIG. 4 is a schematic structural diagram of a base station according to an embodiment of the present invention.

With reference to the method shown in FIG. 2, this embodiment further provides a superposition coding apparatus that is used to implement the method shown in FIG. 2. The apparatus is a first apparatus, and may be located on a base station side. As shown in FIG. 4, the first apparatus 41 includes: a generating unit 411 and a sending unit 412.

The generating unit 411 is configured to generate a superposition coding Superposition Coding signal according to bit data to be separately sent to at least two user equipments UEs.

The sending unit 412 is configured to send notification signaling to at least one UE in the at least two UEs, where the notification signaling carries data selection information, and the data selection information is used for instructing the UE to acquire, from bit data demodulated from the superposition coding signal, at least one bit of data that is of a specific quantity and at a specific location as received data.

The sending unit 412 is further configured to send the superposition coding signal to the at least two UEs.

Figure 5:
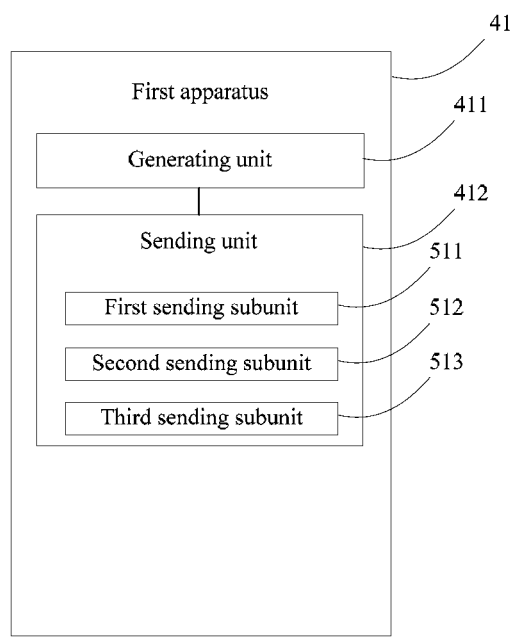
FIG. 5 is a schematic structural diagram of another base station according to an embodiment of the present invention.

Further, as shown in FIG. 5, the sending unit 412 includes:

a first sending subunit 511, configured to send radio resource control RRC signaling to the at least two UEs, where the RRC signaling carries the data selection information; or a second sending subunit 512, configured to send downlink control information DCI to the at least two UEs, where the DCI carries the data selection information; or a third sending subunit 513, configured to send DCI to the at least two UEs, where cyclic redundancy check information CRC in the DCI is scrambled by using a scrambling code, and the scrambling code is used for indicating the data selection information.

Further, the apparatus may further include an instruction unit, configured to separately instruct the at least two UEs to select a respective demodulation scheme.

Further, when a modulation scheme of the superposition coding signal is 16 quadrature amplitude modulation QAM modulation:

the instruction unit is configured to instruct first UE to select quadrature phase shift keying QPSK demodulation, and instruct second UE to select 16QAM demodulation; or the instruction unit 413 is configured to instruct both first UE and second UE to select 16QAM demodulation.

The sending unit 412 is configured to: when the instruction unit instructs the first UE to select the QPSK demodulation and instructs the second UE to select the 16QAM demodulation, send the notification signaling to the first UE and the second UE, where data selection information received by the first UE is used for instructing the first UE to acquire both bits of demodulated data as received data, and data selection information received by the second UE is used for instructing the second UE to acquire last two bits of data in four bits of demodulated data as received data; or the sending unit 412 is further configured to: when the instruction unit instructs both the first UE and the second UE to select the 16QAM demodulation, send the notification signaling to the first UE and the second UE, where data selection information received by the first UE is used for instructing the first UE to use first two bits of data in four bits of demodulated data as received data, and data selection information received by the second UE is used for instructing the second UE to use last two bits of data in four bits of demodulated data as received data.

Further, when a modulation scheme of the superposition coding signal is 64QAM modulation:

the instruction unit is configured to instruct first UE to select QPSK demodulation, and instruct second UE to select 64QAM demodulation; or the instruction unit is configured to instruct first UE to select 16QAM demodulation, and instruct second UE to select 64QAM demodulation; or the instruction unit is configured to instruct both first UE and second UE to select 64QAM demodulation.

The sending unit 412 is configured to: when the instruction unit instructs the first UE to select the QPSK demodulation and instructs the second UE to select the 64QAM demodulation, send the notification signaling to the first UE and the second UE, where data selection information received by the first UE is used for instructing the first UE to acquire both bits of demodulated data as received data, and data selection information received by the second UE is used for instructing the second UE to acquire last four bits of data in six bits of demodulated data as received data; or the sending unit 412 is configured to: when the instruction unit instructs the first UE to select the 16QAM demodulation and instructs the second UE to select the 64QAM demodulation, send the notification signaling to the first UE and the second UE, where data selection information received by the first UE is used for instructing the first UE to acquire all four bits of demodulated data as received data, and data selection information received by the second UE is used for instructing the second UE to acquire last two bits of data in six bits of demodulated data as received data; or the sending unit 412 is configured to: when the instruction unit instructs the first UE to select the 16QAM demodulation and instructs the second UE to select the 64QAM demodulation, send the notification signaling to the first UE and the second UE, where data selection information received by the first UE is used for instructing the first UE to acquire first two bits of data in four bits of demodulated data as received data, and data selection information received by the second UE is used for instructing the second UE to acquire last four bits of data in six bits of demodulated data as received data; or the sending unit 412 is configured to: when the instruction unit instructs both the first UE and the second UE to select the 64QAM demodulation, send the notification signaling to the first UE and the second UE, where data selection information received by the first UE is used for instructing the first UE to acquire first two bits of data in six bits of demodulated data as received data, and data selection information received by the second UE is used for instructing the second UE to acquire last four bits of data in six bits of demodulated data as received data; or the sending unit 412 is configured to: when the instruction unit instructs both the first UE and the second UE to select the 64QAM demodulation, send the notification signaling to the first UE and the second UE, where data selection information received by the first UE is used for instructing the first UE to acquire first four bits of data in six bits of demodulated data as received data, and data selection information received by the second UE is used for instructing the second UE to acquire last two bits of data in six bits of demodulated data as received data.

Further, when a modulation scheme of the superposition coding signal is 256QAM modulation:

the instruction unit is configured to instruct first UE to select QPSK demodulation, and instruct second UE to select 256QAM demodulation; or the instruction unit is configured to instruct first UE to select 16QAM demodulation, and instruct second UE to select 256QAM demodulation; or the instruction unit is configured to instruct first UE to select 64QAM demodulation, and instruct second UE to select 256QAM demodulation; or the instruction unit is configured to instruct both first UE and second UE to select 256QAM demodulation.

The sending unit 412 is configured to: when the instruction unit instructs the first UE to select the QPSK demodulation and instructs the second UE to select the 256QAM demodulation, send the notification signaling to the first UE and the second UE, where data selection information received by the first UE is used for instructing the first UE to acquire both bits of demodulated data as received data, and data selection information received by the second UE is used for instructing the second UE to acquire last six bits of data in eight bits of demodulated data as received data; or the sending unit 412 is configured to: when the instruction unit instructs the first UE to select the 16QAM demodulation and instructs the second UE to select the 256QAM demodulation, send the notification signaling to the first UE and the second UE, where data selection information received by the first UE is used for instructing the first UE to acquire all four bits of demodulated data as received data, and data selection information received by the second UE is used for instructing the second UE to acquire last four bits of data in eight bits of demodulated data as received data; or the sending unit 412 is configured to: when the instruction unit instructs the first UE to select the 16QAM demodulation and instructs the second UE to select the 256QAM demodulation, send the notification signaling to the first UE and the second UE, where data selection information received by the first UE is used for instructing the first UE to acquire first two bits of data in four bits of demodulated data as received data, and data selection information received by the second UE is used for instructing the second UE to acquire last six bits of data in eight bits of demodulated data as received data; or the sending unit 412 is configured to: when the instruction unit instructs the first UE to select the 64QAM demodulation and instructs the second UE to select the 256QAM demodulation, send the notification signaling to the first UE and the second UE, where data selection information received by the first UE is used for instructing the first UE to acquire all six bits of demodulated data as received data, and data selection information received by the second UE is used for instructing the second UE to acquire last two bits of data in eight bits of demodulated data as received data; or the sending unit 412 is configured to: when the instruction unit instructs the first UE to select the 64QAM demodulation and instructs the second UE to select the 256QAM demodulation, send the notification signaling to the first UE and the second UE, where data selection information received by the first UE is used for instructing the first UE to acquire first two bits of data in six bits of demodulated data as received data, and data selection information received by the second UE is used for instructing the second UE to acquire last six bits of data in eight bits of demodulated data as received data; or the sending unit 412 is configured to: when the instruction unit instructs the first UE to select the 64QAM demodulation and instructs the second UE to select the 256QAM demodulation, send the notification signaling to the first UE and the second UE, where data selection information received by the first UE is used for instructing the first UE to acquire first four bits of data in six bits of demodulated data as received data, and data selection information received by the second UE is used for instructing the second UE to acquire last four bits of data in eight bits of demodulated data as received data; or the sending unit 412 is configured to: when the instruction unit instructs both the first UE and the second UE to select the 256QAM demodulation, send the notification signaling to the first UE and the second UE, where data selection information received by the first UE is used for instructing the first UE to acquire first two bits of data in eight bits of demodulated data as received data, and data selection information received by the second UE is used for instructing the second UE to acquire last six bits of data in eight bits of demodulated data as received data; or the sending unit 412 is configured to: when the instruction unit instructs both the first UE and the second UE to select the 256QAM demodulation, send the notification signaling to the first UE and the second UE, where data selection information received by the first UE is used for instructing the first UE to acquire first four bits of data in eight bits of demodulated data as received data, and data selection information received by the second UE is used for instructing the second UE to acquire last four bits of data in eight bits of demodulated data as received data; or the sending unit 412 is configured to: when the instruction unit instructs both the first UE and the second UE to select the 256QAM demodulation, send the notification signaling to the first UE and the second UE, where data selection information received by the first UE is used for instructing the first UE to acquire first six bits of data in eight bits of demodulated data as received data, and data selection information received by the second UE is used for instructing the second UE to acquire last two bits of data in eight bits of demodulated data as received data.

Further, when a modulation scheme of the superposition coding signal is 256QAM modulation:

the instruction unit is configured to instruct first UE to select QPSK demodulation, instruct second UE to select 16QAM demodulation, and instruct third UE to select 256QAM demodulation; or the instruction unit is configured to instruct all of first UE, second UE, and third UE to select 256QAM demodulation.

The sending unit 412 is configured to: when the instruction unit instructs the first UE to select the QPSK demodulation, instructs the second UE to select the 16QAM demodulation, and instructs the third UE to select the 256QAM demodulation, send the notification signaling to the first UE, the second UE, and the third UE, where data selection information received by the first UE is used for instructing the first UE to acquire both bits of demodulated data as received data, data selection information received by the second UE is used for instructing the second UE to acquire last two bits of data in four bits of demodulated data as received data, and data selection information received by the third UE is used for instructing the third UE to acquire last four bits of data in eight bits of demodulated data as received data; or the sending unit 412 is configured to: when the instruction unit instructs all of the first UE, the second UE, and the third UE to select the 256QAM demodulation, send the notification signaling to the first UE, the second UE, and the third UE, where data selection information received by the first UE is used for instructing the first UE to acquire first two bits of data in eight bits of demodulated data as received data, data selection information received by the second UE is used for instructing the second UE to acquire the third and fourth bits of data in eight bits of demodulated data as received data, and data selection information received by the third UE is used for instructing the third UE to acquire last four bits of data in eight bits of demodulated data as received data.

Further, an acquiring unit is configured to separately acquire demodulation capability information sent by the at least two UEs; and the sending unit 412 is configured to: when demodulation capability information, acquired by the acquiring unit, of first UE in the at least two UEs is that only QPSK demodulation is supported, skip sending the notification signaling to the first UE.

The first apparatus provided by this embodiment of the present invention can send a superposition coding signal to at least two UEs, and then send, to the at least two UEs, notification signaling that carries data selection information, where the data selection information is used for instructing the UE to acquire, from demodulated bit data, at least one bit of data that is of a specific quantity and at a specific location as received data. After receiving the notification signaling, each UE acquires, according to the data selection information, at least one bit of data from demodulated bit data as the received data. In this way, by using a manner in which the base station instructs the UE to receive specific bit data, application of a superposition coding technology in systems such as an LTE system, a UMTS system, and a CDMA system is implemented.

In addition, because the first apparatus provided by this embodiment notifies, by sending notification signaling, each UE of bits that need to be acquired as received data, demodulation interference between UEs may be avoided; therefore, the UE does not need to have a SIC function, and restrictive requirements of the superposition coding technology on UE functions can be reduced.

Figure 6:
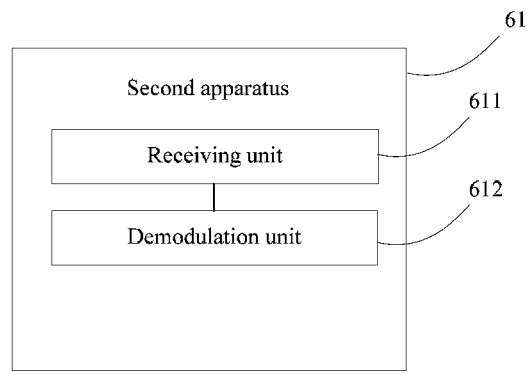
FIG. 6 is a schematic structural diagram of UE according to an embodiment of the present invention.

With reference to the method shown in FIG. 3, this embodiment further provides a superposition coding apparatus that is used to implement the method shown in FIG. 3. The apparatus is a second apparatus, and may be located on a UE side. As shown in FIG. 6, the second apparatus 61 includes: a receiving unit 611 and a demodulation unit 612.

The receiving unit 611 is configured to receive notification signaling sent by a base station, where the notification signaling carries data selection information, and the data selection information is used for instructing a UE to acquire, from bit data demodulated from a received superposition coding signal, at least one bit of data that is of a specific quantity and at a specific location as received data.

The receiving unit 611 is further configured to receive the superposition coding signal sent by the base station.

The demodulation unit 612 is configured to demodulate the superposition coding signal received by the receiving unit 611, and acquire, according to the data selection information received by the receiving unit 611, the received data from the bit data demodulated from the superposition coding signal.

Figure 7:
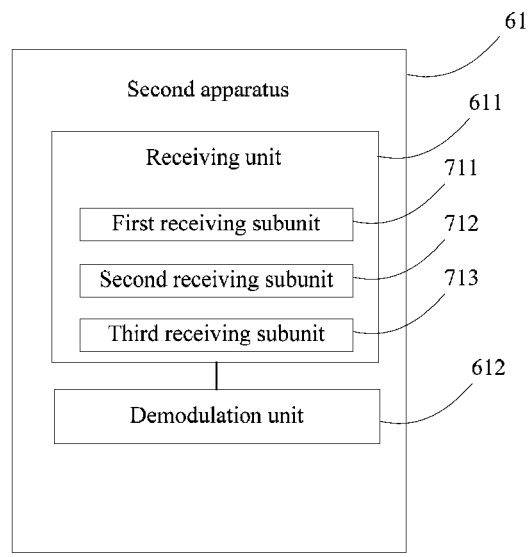
FIG. 7 is a schematic structural diagram of another UE according to an embodiment of the present invention.

Further, as shown in FIG. 7, the receiving unit 611 includes:

a first receiving subunit 711, configured to receive radio resource control RRC signaling sent by the base station, where the RRC signaling carries the data selection information; or a second receiving subunit 712, configured to receive downlink control information DCI sent by the base station, where the DCI carries the data selection information; or a third receiving subunit 713, configured to receive DCI sent by the base station, where cyclic redundancy check information CRC in the DCI is scrambled by using a scrambling code, and the scrambling code is used for indicating the data selection information.

Further, the receiving unit 611 is configured to receive an instruction that is sent by the base station and used for selecting a demodulation scheme;

the selection unit is configured to select a specific demodulation scheme according to the instruction received by the receiving unit 611; and the demodulation unit 612 is configured to demodulate the superposition coding signal according to the specific demodulation scheme selected by the selection unit.

Further, the receiving unit 611 is configured to:

when the selection unit selects quadrature phase shift keying QPSK demodulation according to the instruction received by the receiving unit 611, receive the notification signaling, where the data selection information carried in the notification signaling is acquiring both bits of demodulated data as the received data; or when the selection unit selects 16 quadrature amplitude modulation QAM demodulation according to the instruction received by the receiving unit 611, receive the notification signaling, where the data selection information carried in the notification signaling is acquiring first two bits of data or last two bits of data in four bits of demodulated data as the received data; or when the selection unit selects 16 quadrature amplitude modulation QAM demodulation according to the instruction received by the receiving unit 611, receive the notification signaling, where the data selection information carried in the notification signaling is acquiring all four bits of demodulated data as the received data; or when the selection unit selects 64QAM demodulation according to the instruction received by the receiving unit 611, receive the notification signaling, where the data selection information carried in the notification signaling is acquiring first two bits of data or last two bits of data in six bits of demodulated data as the received data; or when the selection unit selects 64QAM demodulation according to the instruction received by the receiving unit 611, receive the notification signaling, where the data selection information carried in the notification signaling is acquiring first four bits of data or last four bits of data in six bits of demodulated data as the received data; or when the selection unit selects 64QAM demodulation according to the instruction received by the receiving unit 611, receive the notification signaling, where the data selection information carried in the notification signaling is acquiring all six bits of demodulated data as the received data; or when the selection unit selects 256QAM demodulation according to the instruction received by the receiving unit 611, receive the notification signaling, where the data selection information carried in the notification signaling is acquiring first two bits of data or last two bits of data in eight bits of demodulated data as the received data; or when the selection unit selects 256QAM demodulation according to the instruction received by the receiving unit 611, receive the notification signaling, where the data selection information carried in the notification signaling is acquiring first four bits of data or last four bits of data in eight bits of demodulated data as the received data; or when the selection unit selects 256QAM demodulation according to the instruction received by the receiving unit 611, receive the notification signaling, where the data selection information carried in the notification signaling is acquiring first six bits of data or last six bits of data in eight bits of demodulated data as the received data.

Further, the demodulation unit 612 is configured to: when the receiving unit 611 does not receive a demodulation scheme selection instruction sent by the base station, perform QPSK demodulation on the superposition coding signal.

The second apparatus provided by this embodiment of the present invention can receive a superposition coding signal sent by a base station, and then receive notification signaling that is sent by the base station and carries data selection information, where the data selection information is used for instructing UE to acquire, from demodulated bit data, at least one bit of data that is of a specific quantity and at a specific location as received data. After receiving the notification signaling, the UE acquires, according to the data selection information, at least one bit of data from demodulated bit data as the received data. In this way, by using a manner in which the base station instructs the UE to receive specific bit data, application of a superposition coding technology in systems such as an LTE system, a UMTS system, and a CDMA system is implemented.

In addition, in the second apparatus provided by this embodiment, because the UE acquires, by receiving the notification signaling, the data selection information for indicating reception of specific bits, demodulation interference between UEs may be avoided; therefore, the UE does not need to have a SIC function, and restrictive requirements of the superposition coding technology on UE functions can be reduced.

Figure 8:
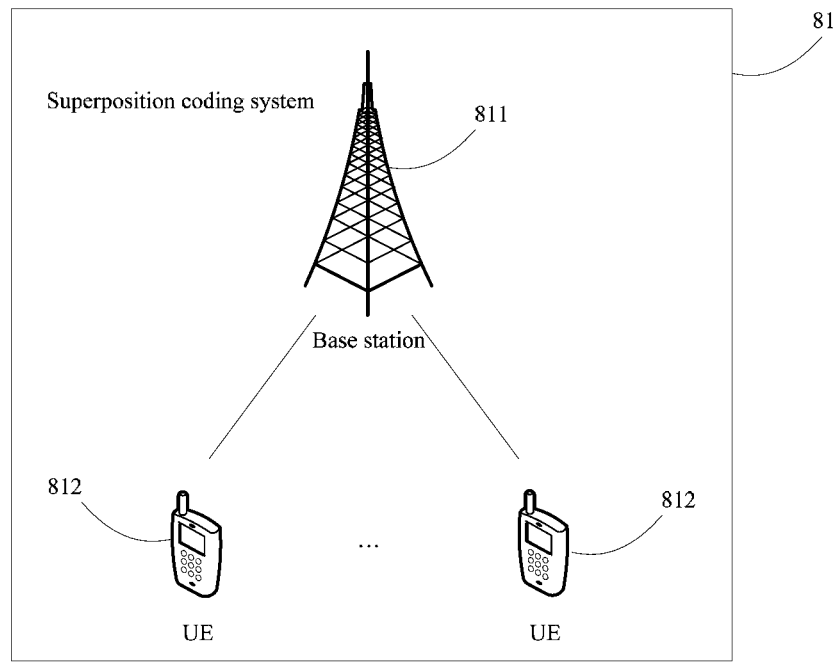
FIG. 8 is a schematic diagram of a superposition coding system according to an embodiment of the present invention.

With reference to the first apparatus shown in FIG. 4 or FIG. 5 and the second apparatus shown in FIG. 6 or FIG. 7, this embodiment further provides a superposition coding system. As shown in FIG. 8, the system 81 includes a base station 811 and at least two UEs 812, where the base station 811 includes the first apparatus shown in FIG. 4 or FIG. 5, and the UE 812 includes the second apparatus shown in FIG. 6 or FIG. 7.

The base station 811 is configured to generate a superposition coding Superposition Coding signal according to bit data to be separately sent to the at least two UEs 812, and send notification signaling to at least one UE 812 in the at least two UEs 812, where the notification signaling carries data selection information, and the data selection information is used for instructing the UE 812 to acquire, from bit data demodulated from the superposition coding signal, at least one bit of data that is of a specific quantity and at a specific location as received data.

The UE 812 is configured to receive the notification signaling sent by the base station 811.

The base station 811 is further configured to send the superposition coding signal to the at least two UEs 812.

The UE 812 is further configured to receive the superposition coding signal sent by the base station 811, demodulate the superposition coding signal, and acquire, according to the data selection information, the received data from the bit data demodulated from the superposition coding signal.

In the superposition coding system provided by this embodiment of the present invention, a base station can send a superposition coding signal to at least two UEs, and then send, to the at least two UEs, notification signaling that carries data selection information, where the data selection information is used for instructing the UE to acquire, from demodulated bit data, at least one bit of data that is of a specific quantity and at a specific location as received data. After receiving the notification signaling, each UE acquires, according to the data selection information, at least one bit of data from demodulated bit data as the received data. In this way, by using a manner in which the base station instructs the UE to receive specific bit data, application of a superposition coding technology in systems such as an LTE system, a UMTS system, and a CDMA system is implemented.

In addition, in the superposition coding system provided by this embodiment, because the base station notifies, by sending notification signaling, each UE of bits that need to be acquired as received data, demodulation interference between UEs may be avoided; therefore, the UE does not need to have a SIC function, and restrictive requirements of the superposition coding technology on UE functions can be reduced.

Figure 9:
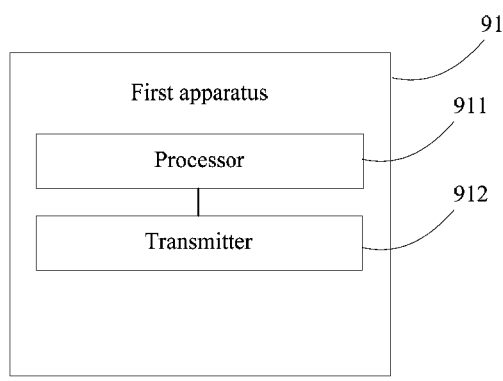
FIG. 9 is a schematic structural diagram of still another base station according to an embodiment of the present invention.

With reference to the method shown in FIG. 2, this embodiment further provides a superposition coding apparatus that is used to implement the method shown in FIG. 2. The apparatus is a first apparatus, and may be located on a base station side. As shown in FIG. 9, the first apparatus 91 includes: a processor 911 and a transmitter 912.

The processor 911 is configured to generate a superposition coding Superposition Coding signal according to bit data to be separately sent to at least two user equipments UEs.

The transmitter 912 is configured to send notification signaling to at least one UE in the at least two UEs, where the notification signaling carries data selection information, and the data selection information is used for instructing the UE to acquire, from bit data demodulated from the superposition coding signal, at least one bit of data that is of a specific quantity and at a specific location as received data.

The transmitter 912 is further configured to send the superposition coding signal to the at least two UEs.

Further, the transmitter 912 is configured to send radio resource control RRC signaling to the at least two UEs, where the RRC signaling carries the data selection information; or the transmitter 912 is configured to send downlink control information DCI to the at least two UEs, where the DCI carries the data selection information; or the transmitter 912 is configured to send DCI to the at least two UEs, where cyclic redundancy check information CRC in the DCI is scrambled by using a scrambling code, and the scrambling code is used for indicating the data selection information.

Further, the processor 911 is configured to separately instruct the at least two UEs to select a respective demodulation scheme.

Further, when a modulation scheme of the superposition coding signal is 16 quadrature amplitude modulation QAM modulation:

the processor 911 is configured to generate information separately used for instructing the at least two UEs to select a respective demodulation scheme; and the transmitter 912 is configured to send, to the at least two UEs, the information that is generated by the processor and separately used for instructing the at least two UEs to select a respective demodulation scheme.

The processor 911 is configured to generate information for instructing first UE to select quadrature phase shift keying QPSK demodulation, and information for instructing second UE to select 16QAM demodulation; and the transmitter 912 is configured to send, to the first UE, the information that is generated by the processor and for instructing the first UE to select quadrature phase shift keying QPSK demodulation, and send, to the second UE, the information that is generated by the processor and for instructing the second UE to select 16QAM demodulation; or the processor 911 is configured to generate information for instructing first UE to select 16QAM demodulation, and generate information for instructing second UE to select 16QAM demodulation; and the transmitter 912 is configured to send, to the first UE, the information for instructing the first UE to select the 16QAM demodulation, and send, to the second UE, the information for instructing the second UE to select the 16QAM demodulation.

Further, the transmitter is configured to send the notification signaling to the first UE and the second UE according to the information for instructing the first UE to select the QPSK demodulation and the information for instructing the second UE to select the 16QAM demodulation that are generated by the processor, where data selection information received by the first UE is used for instructing the first UE to acquire both bits of demodulated data as received data, and data selection information received by the second UE is used for instructing the second UE to acquire last two bits of data in four bits of demodulated data as received data; or the transmitter is configured to send the notification signaling to the first UE and the second UE according to the information for instructing the first UE to select the 16QAM demodulation and the information for instructing the second UE to select the 16QAM demodulation that are generated by the processor, where data selection information received by the first UE is used for instructing the first UE to use first two bits of data in four bits of demodulated data as received data, and data selection information received by the second UE is used for instructing the second UE to use last two bits of data in four bits of demodulated data as received data.

Further, when a modulation scheme of the superposition coding signal is 64QAM modulation:

the processor is further configured to generate information for instructing first UE to select QPSK demodulation, and generate information for instructing second UE to select 64QAM demodulation; and the transmitter is further configured to send, to the first UE, the information for instructing the first UE to select the QPSK demodulation, and send, to the second UE, the information for instructing the second UE to select the 64QAM demodulation; or the processor is further configured to generate information for instructing first UE to select 16QAM demodulation, and generate information for instructing second UE to select 64QAM demodulation; and the transmitter is further configured to send, to the first UE, the information for instructing the first UE to select the 16QAM demodulation, and send, to the second UE, the information for instructing the second UE to select the 64QAM demodulation; or the processor is further configured to generate information for instructing first UE to select 64QAM demodulation, and generate information for instructing second UE to select 64QAM demodulation; and the transmitter is further configured to send, to the first UE, the information for instructing the first UE to select the 64QAM demodulation, and send, to the second UE, the information for instructing the second UE to select the 64QAM demodulation.

The transmitter is configured to send the notification signaling to the first UE and the second UE according to the information for instructing the first UE to select the QPSK demodulation and the information for instructing the second UE to select the 64QAM demodulation that are generated by the processor, where data selection information received by the first UE is used for instructing the first UE to acquire both bits of demodulated data as received data, and data selection information received by the second UE is used for instructing the second UE to acquire last four bits of data in six bits of demodulated data as received data; or the transmitter is configured to send the notification signaling to the first UE and the second UE according to the information for instructing the first UE to select the 16QAM demodulation and the information for instructing the second UE to select the 64QAM demodulation that are generated by the processor, where data selection information received by the first UE is used for instructing the first UE to acquire all four bits of demodulated data as received data, and data selection information received by the second UE is used for instructing the second UE to acquire last two bits of data in six bits of demodulated data as received data; or the transmitter is configured to send the notification signaling to the first UE and the second UE according to the information for instructing the first UE to select the 16QAM demodulation and the information for instructing the second UE to select the 64QAM demodulation that are generated by the processor, where data selection information received by the first UE is used for instructing the first UE to acquire first two bits of data in four bits of demodulated data as received data, and data selection information received by the second UE is used for instructing the second UE to acquire last four bits of data in six bits of demodulated data as received data; or the transmitter is configured to send the notification signaling to the first UE and the second UE according to the information for instructing the first UE to select the 64QAM demodulation and the information for instructing the second UE to select the 64QAM demodulation that are generated by the processor, where data selection information received by the first UE is used for instructing the first UE to acquire first two bits of data in six bits of demodulated data as received data, and data selection information received by the second UE is used for instructing the second UE to acquire last four bits of data in six bits of demodulated data as received data; or the transmitter is configured to send the notification signaling to the first UE and the second UE according to the information for instructing the first UE to select the 64QAM demodulation and the information for instructing the second UE to select the 64QAM demodulation that are generated by the processor, where data selection information received by the first UE is used for instructing the first UE to acquire first four bits of data in six bits of demodulated data as received data, and data selection information received by the second UE is used for instructing the second UE to acquire last two bits of data in six bits of demodulated data as received data.

Further, when a modulation scheme of the superposition coding signal is 256QAM modulation:

the processor is further configured to generate information for instructing first UE to select QPSK demodulation, and generate information for instructing second UE to select 256QAM demodulation; and the transmitter is further configured to send, to the first UE, the information for instructing the first UE to select the QPSK demodulation, and send, to the second UE, the information for instructing the second UE to select the 256QAM demodulation; or the processor is further configured to generate information for instructing first UE to select 16QAM demodulation, and generate information for instructing second UE to select 256QAM demodulation; and the transmitter is further configured to send, to the first UE, the information for instructing the first UE to select the 16QAM demodulation, and send, to the second UE, the information for instructing the second UE to select the 256QAM demodulation; or the processor is further configured to generate information for instructing first UE to select 64QAM demodulation, and generate information for instructing second UE to select 256QAM demodulation; and the transmitter is further configured to send, to the first UE, the information for instructing the first UE to select the 64QAM demodulation, and send, to the second UE, the information for instructing the second UE to select the 256QAM demodulation; or the processor is further configured to generate information for instructing first UE to select 256QAM demodulation, and generate information for instructing second UE to select 256QAM demodulation; and the transmitter is further configured to send, to the first UE, the information for instructing the first UE to select the 256QAM demodulation, and send, to the second UE, the information for instructing the second UE to select the 256QAM demodulation.

The transmitter is configured to send the notification signaling to the first UE and the second UE according to the information for instructing the first UE to select the QPSK demodulation and the information for instructing the second UE to select the 256QAM demodulation that are generated by the processor, where data selection information received by the first UE is used for instructing the first UE to acquire both bits of demodulated data as received data, and data selection information received by the second UE is used for instructing the second UE to acquire last six bits of data in eight bits of demodulated data as received data; or the transmitter is further configured to send the notification signaling to the first UE and the second UE according to the information for instructing the first UE to select the 16QAM demodulation and the information for instructing the second UE to select the 256QAM demodulation that are generated by the processor, where data selection information received by the first UE is used for instructing the first UE to acquire all four bits of demodulated data as received data, and data selection information received by the second UE is used for instructing the second UE to acquire last four bits of data in eight bits of demodulated data as received data; or the transmitter is further configured to send the notification signaling to the first UE and the second UE according to the information for instructing the first UE to select the 16QAM demodulation and the information for instructing the second UE to select the 256QAM demodulation that are generated by the processor, where data selection information received by the first UE is used for instructing the first UE to acquire first two bits of data in four bits of demodulated data as received data, and data selection information received by the second UE is used for instructing the second UE to acquire last six bits of data in eight bits of demodulated data as received data; or the transmitter is further configured to send the notification signaling to the first UE and the second UE according to the information for instructing the first UE to select the 64QAM demodulation and the information for instructing the second UE to select the 256QAM demodulation that are generated by the processor, where data selection information received by the first UE is used for instructing the first UE to acquire all six bits of demodulated data as received data, and data selection information received by the second UE is used for instructing the second UE to acquire last two bits of data in eight bits of demodulated data as received data; or the transmitter is further configured to send the notification signaling to the first UE and the second UE according to the information for instructing the first UE to select the 64QAM demodulation and the information for instructing the second UE to select the 256QAM demodulation that are generated by the processor, where data selection information received by the first UE is used for instructing the first UE to acquire first two bits of data in six bits of demodulated data as received data, and data selection information received by the second UE is used for instructing the second UE to acquire last six bits of data in eight bits of demodulated data as received data; or the transmitter is further configured to send the notification signaling to the first UE and the second UE according to the information for instructing the first UE to select the 64QAM demodulation and the information for instructing the second UE to select the 256QAM demodulation that are generated by the processor, where data selection information received by the first UE is used for instructing the first UE to acquire first four bits of data in six bits of demodulated data as received data, and data selection information received by the second UE is used for instructing the second UE to acquire last four bits of data in eight bits of demodulated data as received data; or the transmitter is further configured to send the notification signaling to the first UE and the second UE according to the information for instructing the first UE to select the 256QAM demodulation and the information for instructing the second UE to select the 256QAM demodulation that are generated by the processor, where data selection information received by the first UE is used for instructing the first UE to acquire first two bits of data in eight bits of demodulated data as received data, and data selection information received by the second UE is used for instructing the second UE to acquire last six bits of data in eight bits of demodulated data as received data; or the transmitter is further configured to send the notification signaling to the first UE and the second UE according to the information for instructing the first UE to select the 256QAM demodulation and the information for instructing the second UE to select the 256QAM demodulation that are generated by the processor, where data selection information received by the first UE is used for instructing the first UE to acquire first four bits of data in eight bits of demodulated data as received data, and data selection information received by the second UE is used for instructing the second UE to acquire last four bits of data in eight bits of demodulated data as received data; or the transmitter is further configured to send the notification signaling to the first UE and the second UE according to the information for instructing the first UE to select the 256QAM demodulation and the information for instructing the second UE to select the 256QAM demodulation that are generated by the processor, where data selection information received by the first UE is used for instructing the first UE to acquire first six bits of data in eight bits of demodulated data as received data, and data selection information received by the second UE is used for instructing the second UE to acquire last two bits of data in eight bits of demodulated data as received data.

Further, when a modulation scheme of the superposition coding signal is 256QAM modulation:

the processor is configured to generate information for instructing first UE to select QPSK demodulation, information for instructing second UE to select 16QAM demodulation, and information for instructing third UE to select 256QAM demodulation; and the transmitter is configured to send, to the first UE, the information for instructing the first UE to select the QPSK demodulation, send, to the second UE, the information for instructing the second UE to select the 16QAM demodulation, and send, to the third UE, the information for instructing the third UE to select the 256QAM demodulation; or the processor is further configured to instruct all of first UE, second UE, and third UE to select 256QAM demodulation; and the transmitter is configured to send, to the first UE, the information for instructing the first UE to select the 256QAM demodulation, send, to the second UE, the information for instructing the second UE to select the 256QAM demodulation, and send, to the third UE, the information for instructing the third UE to select the 256QAM demodulation.

The transmitter is configured to send the notification signaling to the first UE, the second UE, and the third UE according to the information for instructing the first UE to select the QPSK demodulation, the information for instructing the second UE to select the 16QAM demodulation, and the information for instructing the third UE to select the 256QAM demodulation, where data selection information received by the first UE is used for instructing the first UE to acquire both bits of demodulated data as received data, data selection information received by the second UE is used for instructing the second UE to acquire last two bits of data in four bits of demodulated data as received data, and data selection information received by the third UE is used for instructing the third UE to acquire last four bits of data in eight bits of demodulated data as received data; or the transmitter is further configured to send the notification signaling to the first UE, the second UE, and the third UE according to the information for instructing the first UE to select the 256QAM demodulation, the information for instructing the second UE to select the 256QAM demodulation, and the information for instructing the third UE to select the 256QAM demodulation that are generated by the processor, where data selection information received by the first UE is used for instructing the first UE to acquire first two bits of data in eight bits of demodulated data as received data, data selection information received by the second UE is used for instructing the second UE to acquire the third and fourth bits of data in eight bits of demodulated data as received data, and data selection information received by the third UE is used for instructing the third UE to acquire last four bits of data in eight bits of demodulated data as received data.

Further, the apparatus further includes a receiver, configured to separately acquire demodulation capability information sent by the at least two UEs; and the transmitter 912 is configured to: when demodulation capability information, acquired by the receiver, of first UE in the at least two UEs is that only QPSK demodulation is supported, skip sending the notification signaling to the first UE.

The first apparatus provided by this embodiment of the present invention can send a superposition coding signal to at least two UEs, and then send, to the at least two UEs, notification signaling that carries data selection information, where the data selection information is used for instructing the UE to acquire, from demodulated bit data, at least one bit of data that is of a specific quantity and at a specific location as received data. After receiving the notification signaling, each UE acquires, according to the data selection information, at least one bit of data from demodulated bit data as the received data. In this way, by using a manner in which the base station instructs the UE to receive specific bit data, application of a superposition coding technology in systems such as an LTE system, a UMTS system, and a CDMA system is implemented.

In addition, because the first apparatus provided by this embodiment notifies, by sending notification signaling, each UE of bits that need to be acquired as received data, demodulation interference between UEs may be avoided; therefore, the UE does not need to have a SIC function, and restrictive requirements of the superposition coding technology on UE functions can be reduced.

Figure 10:
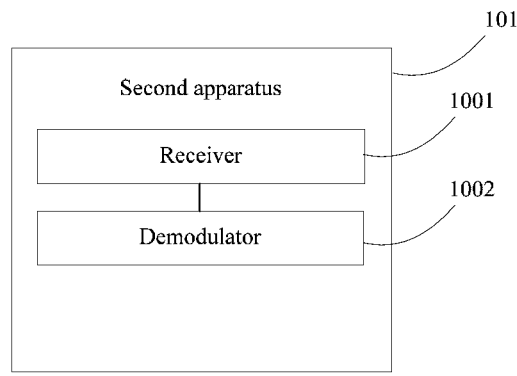
FIG. 10 is a schematic structural diagram of still another UE according to an embodiment of the present invention.

With reference to the method shown in FIG. 3, this embodiment further provides a superposition coding apparatus that is used to implement the method shown in FIG. 3. The apparatus is a second apparatus, and may be located on a UE side. As shown in FIG. 10, the second apparatus 101 includes: a receiver 1001 and a demodulator 1002.

The receiver 1001 is configured to receive notification signaling sent by a base station, where the notification signaling carries data selection information, and the data selection information is used for instructing a UE to acquire, from bit data demodulated from a received superposition coding signal, at least one bit of data that is of a specific quantity and at a specific location as received data.

The receiver 1001 is further configured to receive the superposition coding signal sent by the base station.

The demodulator 1002 is configured to demodulate the superposition coding signal received by the receiver 1001, and acquire, according to the data selection information received by the receiver 1001, the received data from the bit data demodulated from the superposition coding signal.

Further, the receiver 1001 is configured to receive radio resource control RRC signaling sent by the base station, where the RRC signaling carries the data selection information; or the receiver 1001 is configured to receive downlink control information DCI sent by the base station, where the DCI carries the data selection information; or the receiver 1001 is configured to receive DCI sent by the base station, where cyclic redundancy check information CRC in the DCI is scrambled by using a scrambling code, and the scrambling code is used for indicating the data selection information.

The apparatus further includes a processor;

further, the receiver 1001 is configured to receive an instruction that is sent by the base station and used for selecting a demodulation scheme;

the processor is configured to select a specific demodulation scheme according to the instruction received by the receiver 1001; and the demodulator 1002 is configured to demodulate the superposition coding signal according to the specific demodulation scheme selected by the processor.

Further, the receiver 1001 is configured to:

when the processor selects quadrature phase shift keying QPSK demodulation according to the instruction received by the receiver 1001, receive the notification signaling, where the data selection information carried in the notification signaling is acquiring both bits of demodulated data as the received data; or when the processor selects 16 quadrature amplitude modulation QAM demodulation according to the instruction received by the receiver 1001, receive the notification signaling, where the data selection information carried in the notification signaling is acquiring first two bits of data or last two bits of data in four bits of demodulated data as the received data; or when the processor selects 16 quadrature amplitude modulation QAM demodulation according to the instruction received by the receiver 1001, receive the notification signaling, where the data selection information carried in the notification signaling is acquiring all four bits of demodulated data as the received data; or when the processor selects 64QAM demodulation according to the instruction received by the receiver 1001, receive the notification signaling, where the data selection information carried in the notification signaling is acquiring first two bits of data or last two bits of data in six bits of demodulated data as the received data; or when the processor selects 64QAM demodulation according to the instruction received by the receiver 1001, receive the notification signaling, where the data selection information carried in the notification signaling is acquiring first four bits of data or last four bits of data in six bits of demodulated data as the received data; or when the processor selects 64QAM demodulation according to the instruction received by the receiver 1001, receive the notification signaling, where the data selection information carried in the notification signaling is acquiring all six bits of demodulated data as the received data; or when the processor selects 256QAM demodulation according to the instruction received by the receiver 1001, receive the notification signaling, where the data selection information carried in the notification signaling is acquiring first two bits of data or last two bits of data in eight bits of demodulated data as the received data; or when the processor selects 256QAM demodulation according to the instruction received by the receiver 1001, receive the notification signaling, where the data selection information carried in the notification signaling is acquiring first four bits of data or last four bits of data in eight bits of demodulated data as the received data; or when the processor selects 256QAM demodulation according to the instruction received by the receiver 1001, receive the notification signaling, where the data selection information carried in the notification signaling is acquiring first six bits of data or last six bits of data in eight bits of demodulated data as the received data.

Further, the demodulator 1002 is configured to: when the receiver 1001 does not receive a demodulation scheme selection instruction sent by the base station, perform QPSK demodulation on the superposition coding signal.

The second apparatus provided by this embodiment of the present invention can receive a superposition coding signal sent by a base station, and then receive notification signaling that is sent by the base station and carries data selection information, where the data selection information is used for instructing UE to acquire, from demodulated bit data, at least one bit of data that is of a specific quantity and at a specific location as received data. After receiving the notification signaling, the UE acquires, according to the data selection information, at least one bit of data from demodulated bit data as the received data. In this way, by using a manner in which the base station instructs the UE to receive specific bit data, application of a superposition coding technology in systems such as an LTE system, a UMTS system, and a CDMA system is implemented.

In addition, in the second apparatus provided by this embodiment, because the UE acquires, by receiving the notification signaling, the data selection information for indicating reception of specific bits, demodulation interference between UEs may be avoided; therefore, the UE does not need to have a SIC function, and restrictive requirements of the superposition coding technology on UE functions can be reduced.

Figure 11:
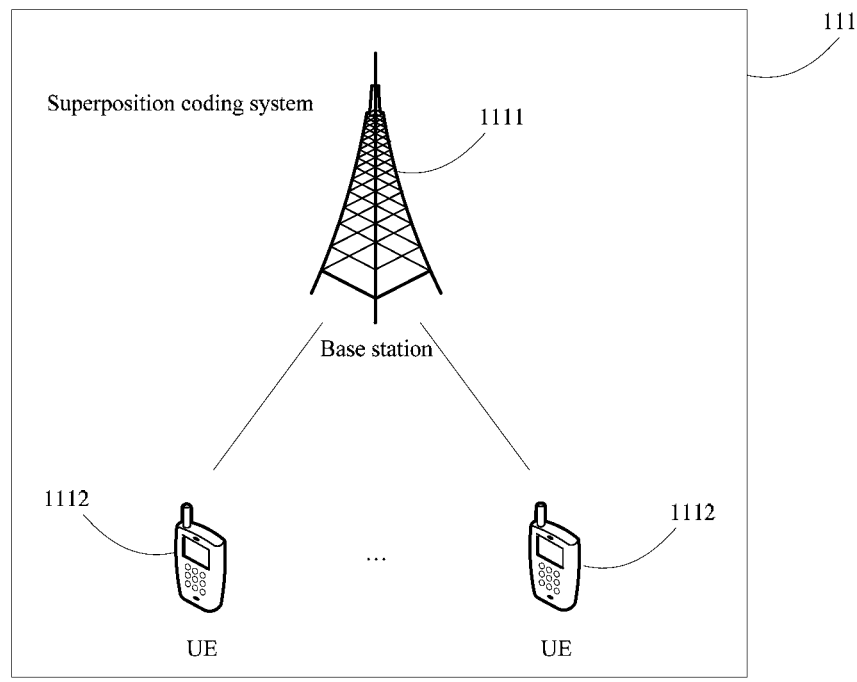
FIG. 11 is a schematic diagram of another superposition coding system according to an embodiment of the present invention.

With reference to the first apparatus shown in FIG. 9 and the second apparatus shown in FIG. 10, this embodiment further provides a superposition coding system. As shown in FIG. 11, the system 111 includes a base station 1111 and at least two UEs 1112, where the base station 1111 includes the first apparatus shown in FIG. 9, and the UE includes the second apparatus shown in FIG. 10.

The base station 1111 is configured to generate a superposition coding Superposition Coding signal according to bit data to be separately sent to the at least two UEs 1112, and send notification signaling to at least one UE 1112 in the at least two UEs 1112, where the notification signaling carries data selection information, and the data selection information is used for instructing the UE 1112 to acquire, from bit data demodulated from the superposition coding signal, at least one bit of data that is of a specific quantity and at a specific location as received data.

The UE 1112 is configured to receive the notification signaling sent by the base station 1111.

The base station 1111 is further configured to send the superposition coding signal to the at least two UEs 1112.

The UE 1112 is further configured to receive the superposition coding signal sent by the base station 1111, demodulate the superposition coding signal, and acquire, according to the data selection information, the received data from the bit data demodulated from the superposition coding signal.

In the superposition coding system provided by this embodiment of the present invention, a base station can send a superposition coding signal to at least two UEs, and then send, to the at least two UEs, notification signaling that carries data selection information, where the data selection information is used for instructing the UE to acquire, from demodulated bit data, at least one bit of data that is of a specific quantity and at a specific location as received data. After receiving the notification signaling, each UE acquires, according to the data selection information, at least one bit of data from demodulated bit data as the received data. In this way, by using a manner in which the base station instructs the UE to receive specific bit data, application of a superposition coding technology in systems such as an LTE system, a UMTS system, and a CDMA system is implemented.

In addition, in the superposition coding system provided by this embodiment, because the base station notifies, by sending notification signaling, each UE of bits that need to be acquired as received data, demodulation interference between UEs may be avoided; therefore, the UE does not need to have a SIC function, and restrictive requirements of the superposition coding technology on UE functions can be reduced.

Based on the foregoing descriptions of the implementation manners, a person skilled in the art may clearly understand that the present invention may be implemented by software in addition to necessary universal hardware or by hardware only. In most circumstances, the former is an exemplary implementation manner. Based on such an understanding, the technical solutions of the present invention essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A superposition coding method comprising:
generating a superposition coding signal according to bit data to be separately sent to at least two user equipments (UEs);
sending notification signaling to at least one UE in the at least two UEs, wherein the notification signaling carries data selection information, and the data selection information is used for instructing the UE to acquire, from another bit data demodulated from the superposition coding signal, at least one bit of data that is of a specific quantity and at a specific location as received data;
sending the superposition coding signal to the at least two UEs; and
when a modulation scheme of the superposition coding signal is 256 quadrature amplitude modulation (QAM) modulation, separately instructing each of the at least two UEs to select a respective demodulation scheme comprising one of the following:
  a) instructing a first UE to select quadrature phase shift keying (QPSK) demodulation, and instructing a second UE to select 256QAM demodulation,
    wherein data selection information received by the first UE is used for instructing the first UE to acquire both bits of demodulated data as the received data, and data selection information received by the second UE is used for instructing the second UE to acquire last six bits of data in eight bits of demodulated data as the received data;
  b) instructing the first UE to select 16QAM demodulation, and instructing the second UE to select the 256QAM demodulation,
    wherein data selection information received by the first UE is used for instructing the first UE to acquire all four bits of demodulated data as received data, and data selection information received by the second UE is used for instructing the second UE to acquire last four bits of data in eight bits of demodulated data as received data, or data selection information received by the first UE is used for instructing the first UE to acquire first two bits of data in four bits of demodulated data as received data, and data selection information received by the second UE is used for instructing the second UE to acquire last six bits of data in eight bits of demodulated data as received data;
  c) instructing the first UE to select 64QAM demodulation, and instructing second UE to select 256QAM demodulation,
    wherein data selection information received by the first UE is used for instructing the first UE to acquire all six bits of demodulated data as received data, and data selection information received by the second UE is used for instructing the second UE to acquire last two bits of data in eight bits of demodulated data as received data, or data selection information received by the first UE is used for instructing the first UE to acquire first two bits of data in six bits of demodulated data as received data, and data selection information received by the second UE is used for instructing the second UE to acquire last six bits of data in eight bits of demodulated data as received data, or data selection information received by the first UE is used for instructing the first UE to acquire first four bits of data in six bits of demodulated data as received data, and data selection information received by the second UE is used for instructing the second UE to acquire last four bits of data in eight bits of demodulated data as received data; and
  d) instructing both the first UE and second UE to select 256QAM demodulation,
    wherein data selection information received by the first UE is used for instructing the first UE to acquire first two bits of data in eight bits of demodulated data as received data, and data selection information received by the second UE is used for instructing the second UE to acquire last six bits of data in eight bits of demodulated data as received data, or
    data selection information received by the first UE is used for instructing the first UE to acquire first four bits of data in eight bits of demodulated data as received data, and data selection information received by the second UE is used for instructing the second UE to acquire last four bits of data in eight bits of demodulated data as received data,
    or data selection information received by the first UE is used for instructing the first UE to acquire first six bits of data in eight bits of demodulated data as received data, and data selection information received by the second UE is used for instructing the second UE to acquire last two bits of data in eight bits of demodulated data as received data.

2. The method according to claim 1, wherein the sending notification signaling to the at least one UE in the at least two UEs, comprises:
  a) sending radio resource control (RRC) signaling to the at least two UEs, wherein the RRC signaling carries the data selection information; or
  b) sending downlink control information (DCI) to the at least two UEs, wherein the DCI carries the data selection information; or
  c) sending the DCI to the at least two UEs, wherein cyclic redundancy check (CRC) information in the DCI is scrambled by using a scrambling code, and the scrambling code is used for indicating the data selection information.

3. The method according to claim 1, wherein when a modulation scheme of the superposition coding signal is 256 quadrature amplitude modulation (QAM) modulation, the separately instructing the at least two UEs to select the respective demodulation scheme comprises:
  a) instructing a first UE to select quadrature phase shift keying (QPSK) demodulation, instructing a second UE to select 16QAM demodulation, and instructing third UE to select the 256QAM demodulation; or
  b) instructing all of the first UE, the second UE, and the third UE to select the 256QAM demodulation.

4. The method according to claim 3, wherein
  a) when the first UE is instructed to select the QPSK demodulation, the second UE is instructed to select the 16QAM demodulation, and the third UE is instructed to select the 256QAM demodulation, data selection information received by the first UE is used for instructing the first UE to acquire both bits of demodulated data as the received data, data selection information received by the second UE is used for instructing the second UE to acquire last two bits of data in four bits of demodulated data as the received data, and data selection information received by the third UE is used for instructing the third UE to acquire last four bits of data in eight bits of demodulated data as received data; or b) when all of the first UE, the second UE, and the third UE are instructed to select the 256QAM demodulation, data selection information received by the first UE is used for instructing the first UE to acquire first two bits of data in eight bits of demodulated data as the received data, data selection information received by the second UE is used for instructing the second UE to acquire the third and fourth bits of data in eight bits of demodulated data as the received data, and data selection information received by the third UE is used for instructing the third UE to acquire last four bits of data in eight bits of demodulated data as received data.

5. A superposition coding apparatus comprising:
a processor configured to generate a superposition coding signal according to bit data to be separately sent to at least two user equipments (UEs) and to generate information separately used for instructing each of the at least two UEs to select a respective demodulation scheme;
a transmitter configured to send notification signaling to at least one UE in the at least two UEs, wherein the notification signaling carries data selection information, and the data selection information is used for instructing the UE to acquire, from another bit data demodulated from the superposition coding signal, at least one bit of data that is of a specific quantity and at a specific location as received data; and
the transmitter is further configured to send the superposition coding signal to the at least two UEs and to send, to the at least two UEs, the information that is generated by the processor and separately used for instructing each of the at least two UEs to select the respective demodulation scheme,
wherein when a modulation scheme of the superposition coding signal is 256QAM modulation, one of the following situations exist:
a) the processor is further configured to generate information for instructing a first UE to select QPSK demodulation, and generate information for instructing a second UE to select 256QAM demodulation; and
the transmitter is further configured to send, to the first UE, the information for instructing the first UE to select the QPSK demodulation, and send, to the second UE, the information for instructing the second UE to select the 256QAM demodulation,
wherein data selection information received by the first UE is used for instructing the first UE to acquire both bits of demodulated data as received data, and data selection information received by the second UE is used for instructing the second UE to acquire last six bits of data in eight bits of demodulated data as received data;
b) the processor is further configured to generate information for instructing the first UE to select 16QAM demodulation, and generate information for instructing the second UE to select 256QAM demodulation; and
the transmitter is further configured to send, to the first UE, the information for instructing the first UE to select the 16QAM demodulation, and send, to the second UE, the information for instructing the second UE to select the 256QAM demodulation,
wherein data selection information received by the first UE is used for instructing the first UE to acquire all four bits of demodulated data as received data, and data selection information received by the second UE is used for instructing the second UE to acquire last four bits of data in eight bits of demodulated data as received data, or
data selection information received by the first UE is used for instructing the first UE to acquire first two bits of data in four bits of demodulated data as received data, and data selection information received by the second UE is used for instructing the second UE to acquire last six bits of data in eight bits of demodulated data as received data;
c) the processor is further configured to generate information for instructing the first UE to select 64QAM demodulation, and generate information for instructing the second UE to select 256QAM demodulation; and
the transmitter is further configured to send, to the first UE, the information for instructing the first UE to select the 64QAM demodulation, and send, to the second UE, the information for instructing the second UE to select the 256QAM demodulation,
wherein data selection information received by the first UE is used for instructing the first UE to acquire all six bits of demodulated data as received data, and data selection information received by the second UE is used for instructing the second UE to acquire last two bits of data in eight bits of demodulated data as received data, or
data selection information received by the first UE is used for instructing the first UE to acquire first two bits of data in six bits of demodulated data as received data, and data selection information received by the second UE is used for instructing the second UE to acquire last six bits of data in eight bits of demodulated data as received data, or
data selection information received by the first UE is used for instructing the first UE to acquire first four bits of data in six bits of demodulated data as received data, and data selection information received by the second UE is used for instructing the second UE to acquire last four bits of data in eight bits of demodulated data as received data; and
d) the processor is further configured to generate information for instructing the first UE to select 256QAM demodulation, and generate information for instructing the second UE to select 256QAM demodulation; and
the transmitter is further configured to send, to the first UE, the information for instructing the first UE to select the 256QAM demodulation, and send, to the second UE, the information for instructing the second UE to select the 256QAM demodulation, wherein data selection information received by the second UE is used for instructing the second UE to acquire last six bits of data in eight bits of demodulated data as received data, or data selection information received by the first UE is used for instructing the first UE to acquire first four bits of data in eight bits of demodulated data as received data, and data selection information received by the second UE is used for instructing the second UE to acquire last four bits of data in eight bits of demodulated data as received data, or data selection information received by the first UE is used for instructing the first UE to acquire first six bits of data in eight bits of demodulated data as received data, and data selection information received by the second UE is used for instructing the second UE to acquire last two bits of data in eight bits of demodulated data as received data.

6. The apparatus according to claim 5, wherein, the transmitter is configured to implement one of the following:
 a) sending radio resource control (RRC) signaling to the at least two UEs, wherein the RRC signaling carries the data selection information;
 b) sending downlink control information (DCI) to the at least two UEs, wherein the DCI carries the data selection information; and
 c) sending the DCI to the at least two UEs, wherein cyclic redundancy check (CRC) information in the DCI is scrambled by using a scrambling code, and the scrambling code is used for indicating the data selection information.

7. The apparatus according to claim 5, wherein when the modulation scheme of the superposition coding signal is 256 quadrature amplitude modulation (QAM) modulation, one of the following situations exist:
 (a) the processor is configured to generate information for instructing the first UE to select quadrature phase shift keying (QPSK) demodulation, information for instructing the second UE to select 16QAM demodulation, and information for instructing a third UE to select the 256QAM demodulation;
  the transmitter is configured to send, to the first UE, the information for instructing the first UE to select the QPSK demodulation, send, to the second UE, the information for instructing the second UE to select the 16QAM demodulation, and send, to the third UE, the information for instructing the third UE to select the 256QAM demodulation; and (b) the processor is further configured to instruct all of first UE, second UE, and third UE to select 256QAM demodulation;
  the transmitter is configured to send, to the first UE, the information for instructing the first UE to select the 256QAM demodulation, send, to the second UE, the information for instructing the second UE to select the 256QAM demodulation, and send, to the third UE, the information for instructing the third UE to select the 256QAM demodulation.

8. The apparatus according to claim 7, wherein, the transmitter is configured to
 a) send the notification signaling to the first UE, the second UE, and the third UE according to the information for instructing the first UE to select the QPSK demodulation, the information for instructing the second UE to select the 16QAM demodulation, and the information for instructing the third UE to select the 256QAM demodulation that are generated by the processor, wherein data selection information received by the first UE is used for instructing the first UE to acquire both bits of demodulated data as received data, data selection information received by the second UE is used for instructing the second UE to acquire last two bits of data in four bits of demodulated data as received data, and data selection information received by the third UE is used for instructing the third UE to acquire last four bits of data in eight bits of demodulated data as received data; or
 b) send the notification signaling to the first UE, the second UE, and the third UE according to the information for instructing the first UE to select the 256QAM demodulation, the information for instructing the second UE to select the 256QAM demodulation, and the information for instructing the third UE to select the 256QAM demodulation that are generated by the processor, wherein data selection information received by the first UE is used for instructing the first UE to acquire first two bits of data in eight bits of demodulated data as received data, data selection information received by the second UE is used for instructing the second UE to acquire the third and fourth bits of data in eight bits of demodulated data as received data, and data selection information received by the third UE is used for instructing the third UE to acquire last four bits of data in eight bits of demodulated data as received data.

* * * * *